(12) United States Patent
Oosawa et al.

(10) Patent No.: US 11,965,582 B2
(45) Date of Patent: Apr. 23, 2024

(54) WORM REDUCER AND ELECTRIC ASSIST DEVICE

(71) Applicant: NSK Ltd., Tokyo (JP)

(72) Inventors: Ryou Oosawa, Maebashi (JP); Satoshi Ishikuri, Maebashi (JP); Haruhiko Kiyota, Maebashi (JP); Souta Matsumoto, Maebashi (JP); Toru Ishii, Maebashi (JP); Hiroyuki Sugawara, Maebashi (JP)

(73) Assignee: NSK LTD., Tokyo (JP)

( * ) Notice: Subject to any disclaimer, the term of this patent is extended or adjusted under 35 U.S.C. 154(b) by 288 days.

(21) Appl. No.: 17/428,492

(22) PCT Filed: Jan. 15, 2020

(86) PCT No.: PCT/JP2020/001120
§ 371 (c)(1),
(2) Date: Aug. 4, 2021

(87) PCT Pub. No.: WO2020/166261
PCT Pub. Date: Aug. 20, 2020

(65) Prior Publication Data
US 2022/0099159 A1    Mar. 31, 2022

(30) Foreign Application Priority Data

Feb. 12, 2019  (JP) ................................. 2019-022224
Jul. 19, 2019  (JP) ................................. 2019-133930

(51) Int. Cl.
*F16H 1/16*    (2006.01)
*B62D 5/04*    (2006.01)
(Continued)

(52) U.S. Cl.
CPC ............. *F16H 1/16* (2013.01); *B62D 5/0409* (2013.01); *B62D 5/0454* (2013.01);
(Continued)

(58) Field of Classification Search
CPC .......... F16H 1/16; F16H 57/022; F16H 57/12; F16H 2057/127; B62D 5/0409; B62D 5/0454

See application file for complete search history.

(56) References Cited

U.S. PATENT DOCUMENTS 11,536,348 B2 * 12/2022 Yagyu ................... F16H 57/039
2009/0255751 A1  10/2009 Kondo et al.
(Continued)

FOREIGN PATENT DOCUMENTS

DE        102008009107 A1    8/2009
DE    10 2010 056 007 A1    6/2012
(Continued)

OTHER PUBLICATIONS

Extended European Search Report dated Oct. 13, 2022 in European Application No. 20755430.4.
(Continued)

*Primary Examiner* — Zakaria Elahmadi
(74) *Attorney, Agent, or Firm* — Sughrue Mion, PLLC

(57) ABSTRACT

A worm reducer has: a housing having a wheel housing portion and a worm housing portion; a worm wheel; a worm, a support bearing having an inner ring externally fitted to the tip end portion of the worm and an outer ring; an elastic biasing means elastically biasing the outer ring toward the worm wheel side; and an elastic holding means elastically holding the outer ring from both sides in a direction orthogonal to a biasing direction by the elastic biasing means and to a center axis of the worm housing portion.

18 Claims, 25 Drawing Sheets

(51) Int. Cl.
    *F16H 57/022*     (2012.01)
    *F16H 57/12*     (2006.01)

(52) U.S. Cl.
    CPC ........... *F16H 57/022* (2013.01); *F16H 57/12* (2013.01); *F16H 2057/127* (2013.01)

(56) References Cited

U.S. PATENT DOCUMENTS

| | | | |
|---|---|---|---|
| 2017/0210412 A1* | 7/2017 | Segawa | F16C 25/06 |
| 2017/0274925 A1 | 9/2017 | Kimijima | |
| 2018/0156325 A1* | 6/2018 | Segawa | F16C 23/06 |
| 2018/0304915 A1 | 10/2018 | Kawamura et al. | |

FOREIGN PATENT DOCUMENTS

| | | |
|---|---|---|
| EP | 3 088 277 B1 | 11/2018 |
| JP | 2004-306898 A | 11/2004 |
| JP | 2005-042913 A | 2/2005 |
| JP | 2010-095006 A | 4/2010 |
| JP | 2011-255811 A | 12/2011 |
| JP | 2013-203257 A | 10/2013 |
| JP | 2018-179237 A | 11/2018 |
| WO | 2008/087749 A1 | 7/2008 |
| WO | 2017/002393 A1 | 1/2017 |

OTHER PUBLICATIONS

International Search Report of PCT/JP2020/001120 dated Mar. 17, 2020 [PCT/ISA/210].

* cited by examiner

WORM REDUCER AND ELECTRIC ASSIST DEVICE

CROSS REFERENCE TO RELATED APPLICATIONS

This application is a National Stage of International Application No. PCT/JP2020/001120 filed on Jan. 15, 2020, claiming priority based on Japanese Patent Application No. 2019-022224 filed on Feb. 12, 2019 and Japanese Patent Application No. 2019-133930 filed on Jul. 19, 2019.

TECHNICAL FIELD

The present invention relates to a worm reducer including a worm and a worm wheel, and relates to an electric assist device including the worm reducer.

BACKGROUND ART

In a steering device for automobiles, when a driver operates a steering wheel, the rotation of the steering wheel is transmitted to an input shaft of a steering gear unit via a steering shaft and an intermediate shaft. When a rack shaft of the steering gear unit is displaced in the width direction of the vehicle due to the rotation of the input shaft, a pair of tie rods are pushed and pulled so as to apply a steering angle to steered wheels.

JP 2005-042913A and JP 2004-306898A disclose an electric power steering device that uses an electric motor as an auxiliary power source to reduce the force required for the driver to operate the steering wheel. In the electric power steering device, the torque of the electric motor is increased by a worm reducer, and then applied to a rotating shaft such as a steering shaft or a steering gear unit, or to a linear motion shaft such as a rack shaft of the steering gear unit or a screw shaft.

FIG. 25 illustrates a structure of the worm reducer described in JP 2004-306898A. The worm reducer 12 includes a housing 14, a worm wheel 15, and a worm 16.

The housing 14 has a wheel housing portion 21 and a worm housing portion 22 having a center axis at a skew position with respect to the center axis of the wheel housing portion 21 and a middle section in the axial direction opened to the inside of the wheel housing portion 21.

The worm wheel 15 has wheel teeth 29 on the outer circumferential surface, and is supported by and fixed to a rotating shaft such as a steering shaft 6 which is rotatably supported inside the wheel housing portion 21 and is coaxially arranged around with the rotating shaft.

The worm 16 has worm teeth 32 that engage with the wheel teeth 29 on the outer circumferential surface in the middle section in the axial direction. Two locations in the axial direction of the worm 16 with the worm teeth 32 in between are supported by a support bearing 17 and a ball bearing 40 inside the worm housing portion 22 so as to rotate freely. The outer ring of the support bearing 17 supporting the tip end side of the worm 16 (right side in FIG. 25) is press-fitted into a holder 106 which is internally fitted and fixed to the inside of the bottom-end side portion of the worm housing portion 22. The inner ring of the support bearing 17 is externally fitted to a large diameter portion 107 of the worm 16 provided in a portion on the tip end side from the worm teeth 32 with a clearance fit while interposing a bush 108 made of synthetic resin therebetween. More specifically, the inner ring of the support bearing 17 is externally fitted to the bush 108, which is externally fitted to the large diameter portion 107 of the worm 16 with a clearance fit, without any looseness. The outer ring of the ball bearing 40 that supports the base-end side of the worm 16 (left side in FIG. 25) is press-fitted into an opening of the worm housing portion 22, and the inner ring of the ball bearing 40 is externally fitted to the base-end portion of the worm 16. The output shaft of the electric motor 11 is connected to the base-end portion of the worm 16 so as to be able to transmit torque. Therefore, the worm 16 may be rotated and driven by the electric motor 11.

In the worm reducer 12, an unavoidable backlash is present at the area of engagement between the wheel teeth 29 and the worm teeth 32 based on dimensional errors and assembly errors or the like in each part of the worm reducer 12. Due to the presence of this backlash, when the rotational direction of the steering wheel is changed, an unpleasant chattering may occur at the area of engagement. In the illustrated example, the tip end portion of the worm 16 is elastically biased toward the worm wheel 15 side in order to suppress the occurrence of such chattering.

The base-end portion of the worm 16 is supported with respect to the worm housing portion 22 by the ball bearing 40 having a radial gap so as to enable a slight pivotal displacement. An annular gap exists over the entire circumference between the outer circumferential surface of the large diameter portion 107 of the worm 16 and the inner circumferential surface of the bush 108. A pad 109 is externally fitted to the tip end portion of the worm 16, and a helical torsion spring 110 is provided between the pad 109 and the holder 106. By elastically pressing the pad 109 toward the worm wheel 15 side (upper side in FIG. 25) in the first direction (up-down direction in FIG. 25) orthogonal to the center axis of the electric motor 11 and the center axis of the worm wheel 15 by the helical torsion spring 110, the tip end portion of the worm 16 is elastically pressed toward the worm wheel 15 side in the first direction. Due to this, backlash between the wheel teeth 29 and the worm teeth 32 is suppressed, and the occurrence of chattering is suppressed.

CITATION LIST

Patent Literatures

Patent Literature 1: JP 2005-042913A
Patent Literature 2: JP 2004-306898A

SUMMARY OF INVENTION

Technical Problem

In order to secure a large range of allowance in dimensional errors and assembly errors of each part of the worm reducer, it is required to secure a large amount that the tip end portion of the worm can be displaced in the first direction.

Moreover, in order to reduce the chattering that occurs at the area of engagement between the worm teeth and the wheel teeth and to reduce the weight, the worm wheel may be configured by combining a metal inner wheel element and a synthetic resin outer wheel element having wheel teeth on the outer circumferential surface. When a worm wheel having such a structure is used, the outer wheel element made of synthetic resin may expand due to water absorption or heat, and friction at the area of engagement between the worm teeth and the wheel teeth may increase. From the aspect of preventing an increase in friction at the area of engagement between the worm teeth and the wheel teeth due to the expansion of the outer wheel element as well, the amount that the tip end portion of the worm may displace in the first direction is required to be largely secured.

In the structure described in JP 2004-306898A, a gap exists over the entire circumference between the outer circumferential surface of the large diameter portion 107 of the worm 16 and the inner circumferential surface of the bush 10. Accordingly, in order to secure a large amount that the tip end portion of the worm 16 may displace in the first direction, if the space of the gap in the first direction is increased, the space in a direction orthogonal to the first direction (front-back direction in FIG. 25) also increases. As a result, when changing the rotational direction of the steering wheel, the tip end portion of the worm 16 may be displaced in a direction orthogonal to the pressing direction of the helical torsion spring 110 (front-back direction in FIG. 25).

Taking the situation described above into consideration, the objective of the present invention is to achieve a structure of a worm reducer comprising a means for applying elasticity to the tip end portion of the worm in a direction approaching the worm wheel, wherein the tip end portion may be prevented from being displaced in a direction orthogonal to the direction of elasticity. Moreover, the objective of the present invention is to provide an electric assist device including a worm reducer having such a structure.

Solution to Problem

The worm reducer of an embodiment of the present invention includes a housing, a worm wheel, a worm, a support bearing, an elastic biasing means, and an elastic holding means.

The housing has a wheel housing portion and a worm housing portion that is arranged in a skew position with respect to the wheel housing portion and has a middle section in the axial direction that is open to the wheel housing portion.

The worm wheel has wheel teeth on the outer circumferential surface, and is supported inside the wheel housing portion so as to be able to rotate freely.

The worm has worm teeth that engage with the wheel teeth on the outer circumferential surface, and is supported inside the worm housing portion so as to be able to rotate freely.

The support bearing has an inner ring which is externally fitted to the tip end portion of the worm and an outer ring which is arranged coaxially with the inner ring around the inner ring.

The elastic biasing means elastically biases the support bearing toward the worm wheel side either directly or through a member other than the outer ring such as a guide member which is externally fitted to the outer ring.

The elastic holding means elastically holds the outer ring from both sides with respect to the second direction orthogonal to the first direction which is a biasing direction by the elastic biasing means and the center axis of the worm housing portion either directly or through a member other than the outer ring such as a guide member which is externally fitted to the outer ring.

The elastic holding means may be composed of a leaf spring.

The worm reducer of an embodiment of the present invention may include a guide member to which the outer ring is internally fitted so as to be able to displace in the first direction and that is internally fitted inside the worm housing portion, and the elastic holding means may be arranged at a portion between the outer ring and the guide member.

The elastic holding means may include a pair of holding leaf springs that is arranged on both side portions in the second direction of a portion between the outer ring and the guide member.

Each of the pair of holding leaf springs may include a pair of distal side arm portions that are arranged so as to be separated from each other in the axial direction of the guide member, and a base portion that connects the base-end portions of the pair of distal side arm portions to each other and has an inside surface in the radial direction of the guide member that is elastically brought into contact with the outer circumferential surface of the outer ring.

Each of the pair of holding leaf springs may include a pair of proximal side arm portions that extend from end portions on both sides of the base portion in the axial direction of the guide member toward the side close to the worm wheel in the first direction.

Each of the pair of holding leaf springs may include a locking piece for locking each of the pair of holding leaf springs to the guide member.

The elastic biasing means may elastically press the portion of the outer ring on the side far from the worm wheel toward the worm wheel side either directly or through a member other than the outer ring.

The elastic biasing means may be constructed by a leaf spring.

The worm reducer of an embodiment of the present invention may include a guide member to which the outer ring is internally fitted so as to be able to displace in the first direction and that is internally fitted inside the worm housing portion, and the elastic biasing means may be arranged at a portion between the outer ring and the guide member or between the outer ring and the worm housing portion.

The guide member may include a bearing surface portion that directly faces the outer ring at least at one location in the circumferential direction of the inner circumferential surface on the side far from the worm wheel in the first direction, preferably at two positions separated in the circumferential direction.

The worm reducer of an embodiment of the present invention may include an elastic ring which is elastically sandwiched between the inner circumferential surface of the worm housing portion and the outer circumferential surface of the guide member.

The elastic compression amount of the elastic ring on the side close to the worm wheel may be made larger than the elastic compression amount of the elastic ring on the side far from the worm wheel.

The elastic ring may be locked to the outer circumferential surface of the guide member in a state where the center axis of the elastic ring is offset with respect to the center axis of the guide member toward the side close to the worm wheel in the first direction.

The worm reducer of the present invention may include a cover supported by an opening of the guide member located on the tip end side of the worm.

The electric assist device of an embodiment of the present invention includes an electric motor and a worm reducer that increases torque of the electric motor and applies the torque to a rotating shaft that rotates with the rotation of a steering wheel or a linear motion shaft of a steering gear unit. In particular, the worm reducer of the electric assist device of an embodiment of the present invention is constructed by the worm reducer of an embodiment of the present invention.

Advantageous Effect of Invention

With the worm reducer and the electric assist device of an embodiment of the present invention, when changing the rotational direction of the worm wheel, it is possible to prevent the tip end portion of the worm from being displaced in a direction orthogonal to the biasing direction by the elastic biasing means.

BRIEF DESCRIPTION OF DRAWINGS

FIG. 12 (A) is a plan view of the pressing leaf spring of the guide assembly of the first example.

DESCRIPTION OF EMBODIMENTS

First Example

Figure 1:
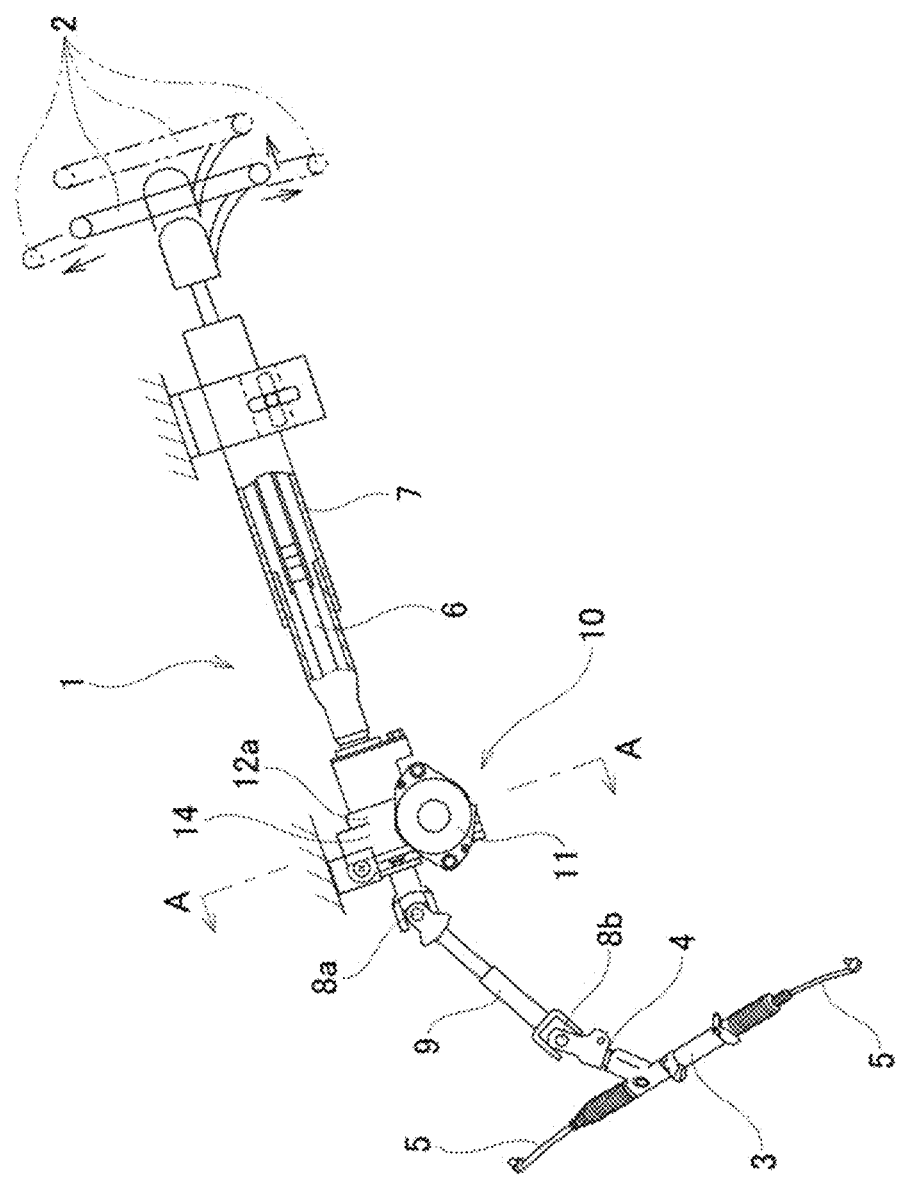
FIG. 1 is a partial cross-sectional view illustrating a column assist type electric power steering device incorporating the electric assist device of a first example of the present invention.

FIG. 1 through FIG. 14(D) illustrate a first example of the present invention. This example is an example in which an electric assist device of the present invention is applied to a column assist type electric power steering device. As illustrated in FIG. 1, in the electric power steering device 1, the rotation of the steering wheel 2 is transmitted to the input shaft 4 of the steering gear unit 3. When a pair of tie rods 5 are pushed and pulled as the input shaft 4 rotates, a steering angle is applied to the steered wheels. The steering wheel 2 is supported and fixed to at the rear-end portion of the steering shaft 6, and the steering shaft 6 is rotatably supported inside a steering column 7. The front-end portion of the steering shaft 6 is connected to the rear-end portion of an intermediate shaft 9 through a universal joint 8a, and the front-end portion of the intermediate shaft 9 is connected to the input shaft 4 through another universal joint 8b.

The electric power steering device 1 includes an electric assist device 10 that applies auxiliary power to the steering shaft 6 in order to reduce the force required for the driver to operate the steering wheel 2. The electric assist device 10 includes an electric motor 11 and a worm reducer 12a. That is, the electric assist device 10 applies the rotational torque of the output shaft 13 of the electric motor 11 to the steering shaft 6 while being increased by the worm reducer 12a.

The worm reducer 12a includes a housing 14, a worm wheel 15, a worm 16, a support bearing 17, a guide member 18, an elastic biasing means 81, and an elastic holding means 82.

The housing 14 is a cast product made of a ferrous alloy, die-cast product made of a light alloy such as aluminum alloy, or an injection molded product made of synthetic resin, and includes a wheel housing portion 21 and a worm housing portion 22 that is arranged in a skew position with respect to the wheel housing portion 21 and has a middle section in the axial direction that is open to the wheel housing portion 21.

The wheel housing portion 21 is supported by and fixed to the front-end portion of the steering column 7 so that its center axis and the center axis of the steering column 7 are coaxial with each other.

The worm housing portion 22 is formed into a cylindrical shape and has openings at end portions on both sides in the axial direction. The opening on one side in the axial direction of the worm housing portion 22 (right side in FIG. 2) is closed by an electric motor 11 which is connected and fixed to the housing 14, and the opening on the other side in the axial direction of the worm housing portion 22 (left side in FIG. 2) is closed by a cover 23.

Figure 2:
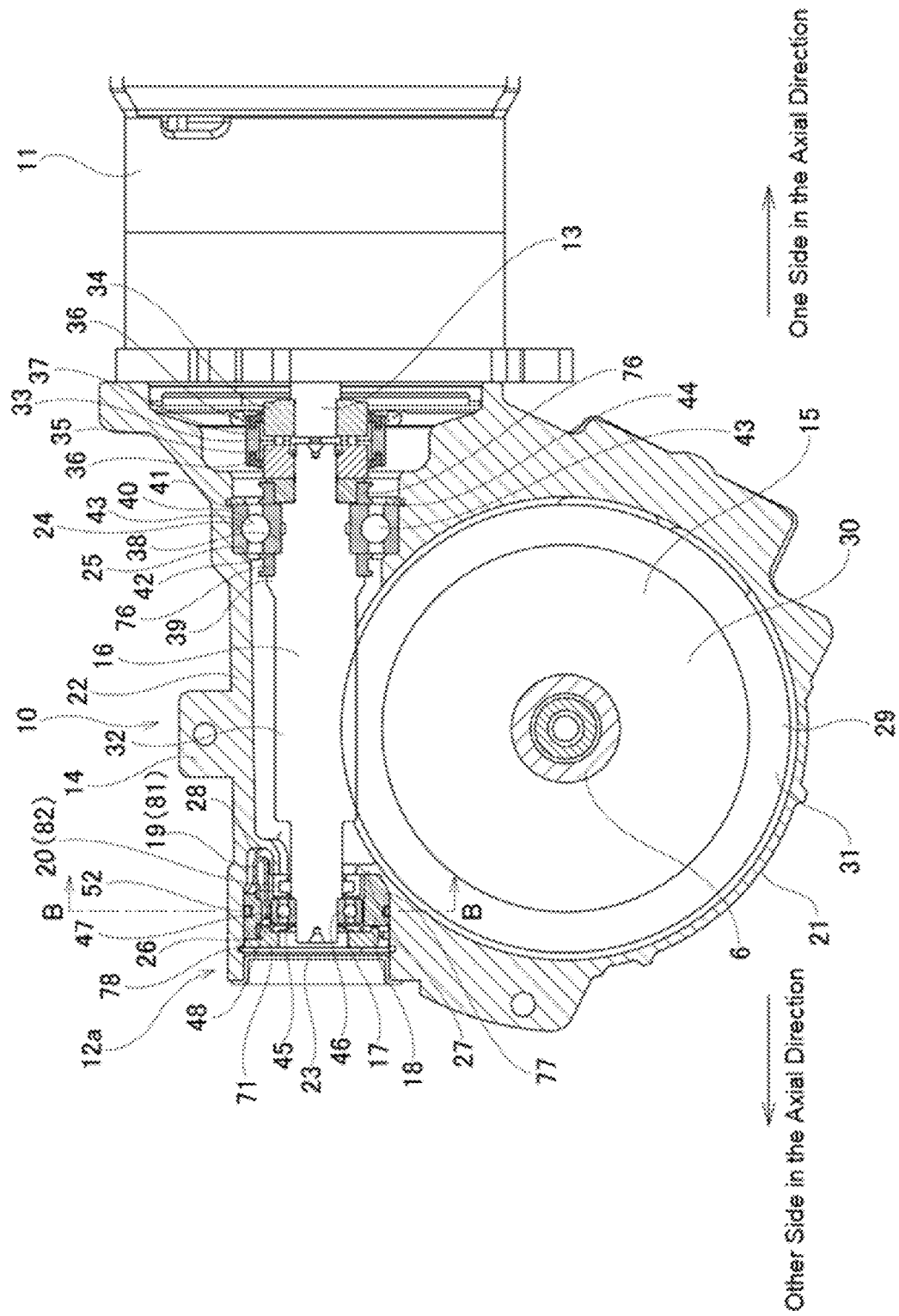
FIG. 2 is a cross-sectional view taken along section A-A in FIG. 1.

Regarding the worm housing portion 22, the worm 16 which is rotatably supported inside the worm housing portion 22, and members arranged around the worm 16, the one side in the axial direction is the base-end side of the worm 16, which is the right side in FIG. 2, and the other side in the axial direction is the tip end side of the worm, which is the left side in FIG. 2.

The worm housing portion 22 has a cylindrical surface portion 24 having a cylindrical surface shape on the inner circumferential surface of a portion on the one side in the axial direction, and has a stepped portion 25 facing the one side in the axial direction at the end portion on the other side in the axial direction of the cylindrical surface portion 24. The worm housing portion 22 has a guide support portion 26 having a cylindrical surface shape on the inner circumferential surface of a portion on the other side in the axial direction, and has an inward flange portion 27 projecting inward in the radial direction at a portion adjacent to the one side in the axial direction of the guide support portion 26. Moreover, the worm housing portion 22 has an engaging concave portion 28 which is recessed on the one side in the axial direction at an end portion of the other side surface in the axial direction of the inward flange portion 27, which is far from the wheel housing portion 21 in the circumferential direction.

The worm wheel 15 has wheel teeth 29, which are helical gears, on the outer circumferential surface, and is rotatably supported inside the wheel housing portion 21. In this example, the worm wheel 15 is supported by and fixed to the front-end portion of the steering shaft 6 with the worm wheel 15 arranged around the front-end portion of the steering shaft 6 so as to rotate integrally with the steering shaft 6 which is rotatably supported inside the wheel housing portion 21. The worm wheel 15 of this example includes an inner wheel element 30 which is made of metal and has a circular plate shape, and an outer wheel element 31 made of synthetic resin which is connected and fixed around the inner wheel element 30 and has wheel teeth 29 on the outer circumferential surface.

The worm 16 has screw-shaped worm teeth 32 that engage with the wheel teeth 29 of the worm wheel 15 on the outer circumferential surface of the middle section in the axial direction, and is rotatably supported inside the worm housing portion 22. The base-end portion of the worm 16 is connected to the output shaft 13 of the electric motor 11 through a torque transmission joint 33 so as to be able to transmit torque.

The torque transmission joint 33 includes a drive-side transmission member 34 which is externally fitted and fixed to the tip end portion of the output shaft 13 of the electric motor 11 (left-end portion in FIG. 2), a driven-side transmission member 35 which is externally fitted and fixed to the base-end portion of the worm 16, a pair of elastic members 36 each of which is made of an elastic material such as an elastomer including rubber, and a coupling 37 made of synthetic resin or a metal material.

When the torque transmitted between the output shaft 13 of the electric motor 11 and the worm 16 is relatively small, the torque transmission joint 33 transmits the rotational torque of the output shaft 13 from the drive-side transmission member 34 to the coupling 37 through an elastic member 36 on the one side in the axial direction, and transmits the rotational torque of the coupling 37 to the driven-side transmission member 35 through an elastic member 36 on the other side in the axial direction. On the other hand, when the torque transmitted between the output shaft 13 of the electric motor 11 and the worm 16 is large, since the pair of elastic members 36 are elastically crushed in the circumferential direction, the torque transmission joint 33 directly transmits the rotational torque of the output shaft 13 from the drive-side transmission member 34 to the coupling 37, and directly transmits the rotational torque of the coupling 37 to the driven-side transmission member 35.

As a specific structure of the torque transmission joint 33, various conventionally known structures may be adopted. In this example, by connecting the tip end portion of the output shaft 13 of the electric motor 11 and the base-end portion of the worm 16 through the torque transmission joint 33 so as to be able to transmit torque, occurrence of chattering in the torque transmission portion between the output shaft 13 of the electric motor 11 and the worm 16 is prevented, and swinging of the worm 16 with respect to the output shaft 13 is made possible. However, as long as torque can be transmitted between the output shaft 13 of the electric motor 11 and the worm 16 and the worm 16 can swing with respect to the output shaft 13, the connection method between the tip end portion of the output shaft 13 of the electric motor 11 and the base-end portion of the worm 16 is not particularly limited, and they may also be connected by spline engagement or the like.

The worm 16 includes a fitting tubular portion 38 and a flange portion 39 protruding outward in the radial direction in order from the base-end side (the one side in the axial direction) in a portion between the base-end portion to which the driven-side transmission member 35 is externally fitted and the middle section in the axial direction provided with the worm teeth 32. The fitting tubular portion 38 of the worm 16 is rotatably supported by a ball bearing 40 with respect to the cylindrical surface portion 24 of the worm housing portion 22. The ball bearing 40 includes an outer ring 41, an inner ring 42, and a plurality of balls.

The outer ring 41 is internally fitted within the cylindrical surface portion 24 of the worm housing portion 22 by a clearance fit, and is held from both sides in the axial direction between the stepped portion 25 and the retaining ring 44 locked to the cylindrical surface portion 24. A side surface on the other side in the axial direction of the outer ring 41 is abutted against the stepped portion 25, and a side surface on the one side in the axial direction of the outer ring 41 is abutted against the retaining ring 44. However, the outer ring 41 may also be internally fitted to the cylindrical surface portion 24 of the worm housing portion 22 by an interference fit.

The inner ring 42 is externally fitted to the fitting tubular portion 38 of the worm 16 without any looseness, and is held from both sides in the axial direction between a side surface on the one side in the axial direction of the flange portion 39 and a side surface on the other side in the axial direction of the driven-side transmission member 35 which is externally fitted to the base-end portion of the worm 16 through a pair of elastic members 76. A side surface on the one side in the axial direction of the inner ring 42 is abutted against the other side surface in the axial direction of the driven-side transmission member 35 through an elastic member 76 on the one side in the axial direction, and a side surface on the other side in the axial direction of the inner ring 42 is abutted against the one side surface in the axial direction of the flange portion 39 through an elastic member 76 on the other side in the axial direction.

The plurality of balls 43 are arranged between an outer raceway provided on the inner circumferential surface of the outer ring 41 and an inner raceway provided on the outer circumferential surface of the inner ring 42 so as to be able to roll freely.

The ball bearing 40 has a radial gap between the outer ring 41 and the inner ring 42 and the balls 43. Therefore, the fitting tubular portion 38 of the worm 16 is supported by the cylindrical surface portion 24 of the worm housing portion 22 so as to be able to rotate and pivotally displace.

The worm 16 has a small-diameter tubular portion 45, which has an outer diameter smaller than a portion adjacent to the base-end side (the one side in the axial direction), at the tip end portion (the other end potion in the axial direction). The small-diameter tubular portion 45 of the worm 16 is supported by the support bearing 17 and the guide member 18 with respect to the guide support portion 26 of the worm housing portion 22 so as to be able to rotate freely and to move away from and close to the worm wheel 15.

The support bearing 17 includes an inner ring 46 which is externally fitted and fixed to the small-diameter tubular portion 45, an outer ring 47 which is arranged coaxially with the inner ring 46 around the inner ring 46, and a plurality of rolling bodies 48 which are arranged between an inner raceway provided on an outer circumferential surface of the inner ring 46 and an outer raceway provided on an inner circumferential surface of the outer ring 47. In this example, a ball bearing in which the rolling bodies 48 are balls is used as the support bearing 17, however, a radial roller bearing and a radial needle bearing may also be used.

The support bearing 17 is arranged inside the guide support portion 26 of the worm housing portion 22 through the guide member 18 so as to be able to move away from and close to the worm wheel 15. The support bearing 17 is elastically biased toward the worm wheel 15 side by the elastic biasing means 81. In this example, the elastic biasing means 81 comprises a pressing leaf spring 19 which is arranged at an end portion of a portion between the outer ring 47 and the guide member 18 on the side far from the worm wheel 15.

Figure 3:
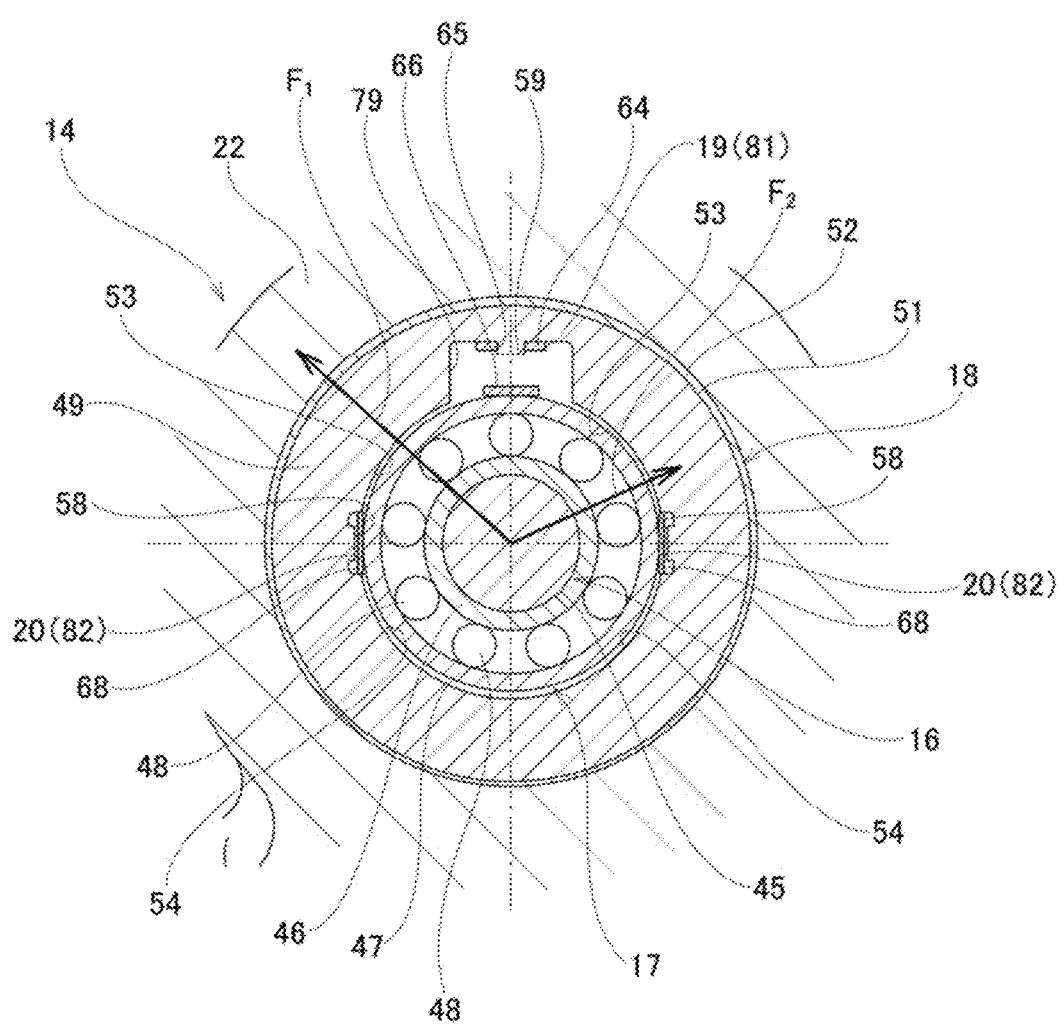
FIG. 3 is a cross-sectional view taken along section B-B in FIG. 2.
Figure 4:
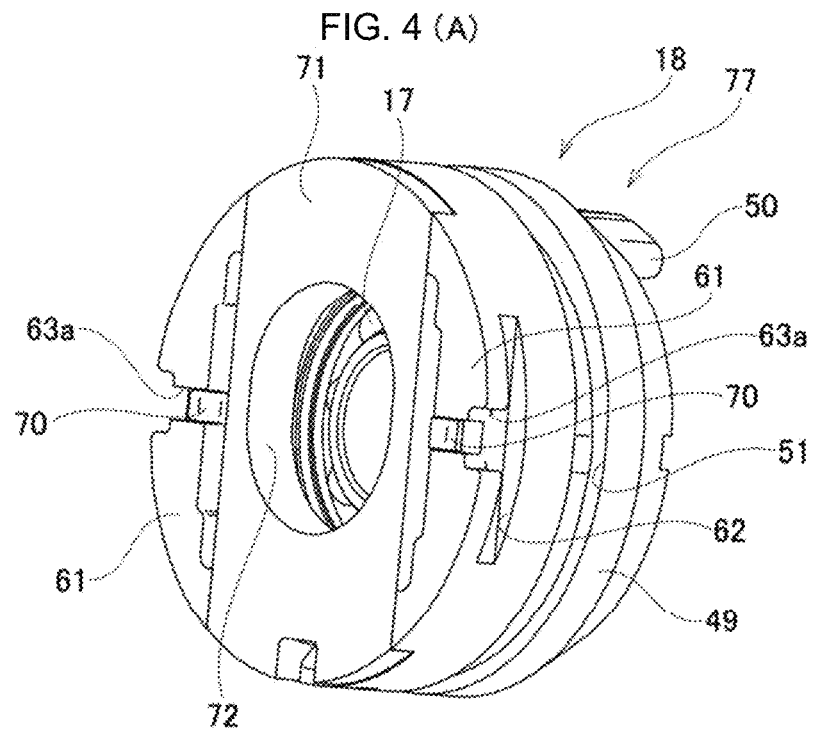
FIG. 4(A) is a perspective view of a guide assembly of the worm reducer of the electric assist device of the first example.
FIG. 4(B) is a perspective view of the guide assembly as viewed from the opposite side of FIG. 4(A).
Figure 4:
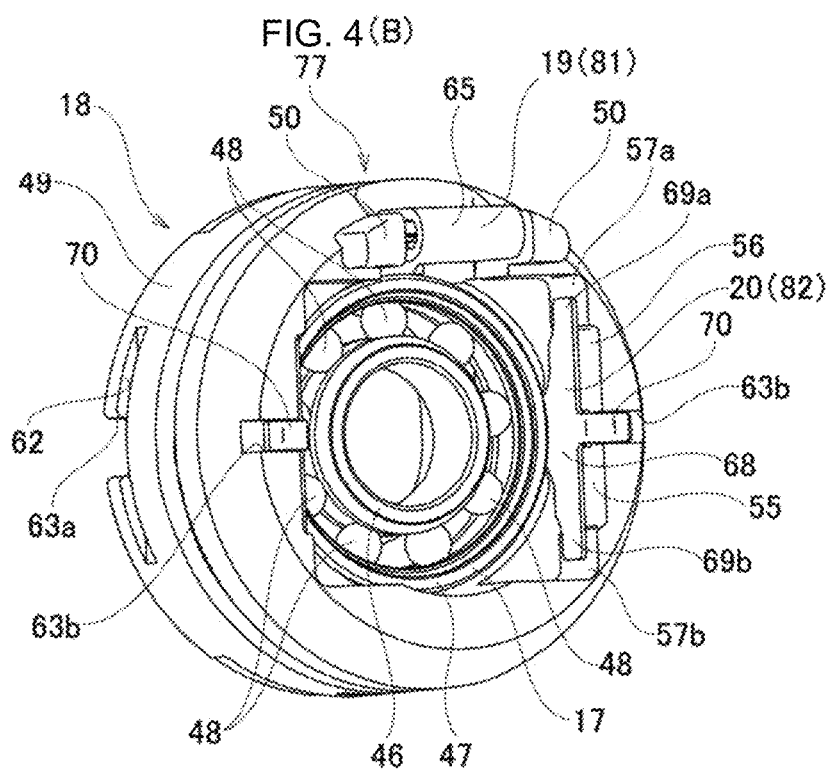
Figure 5:
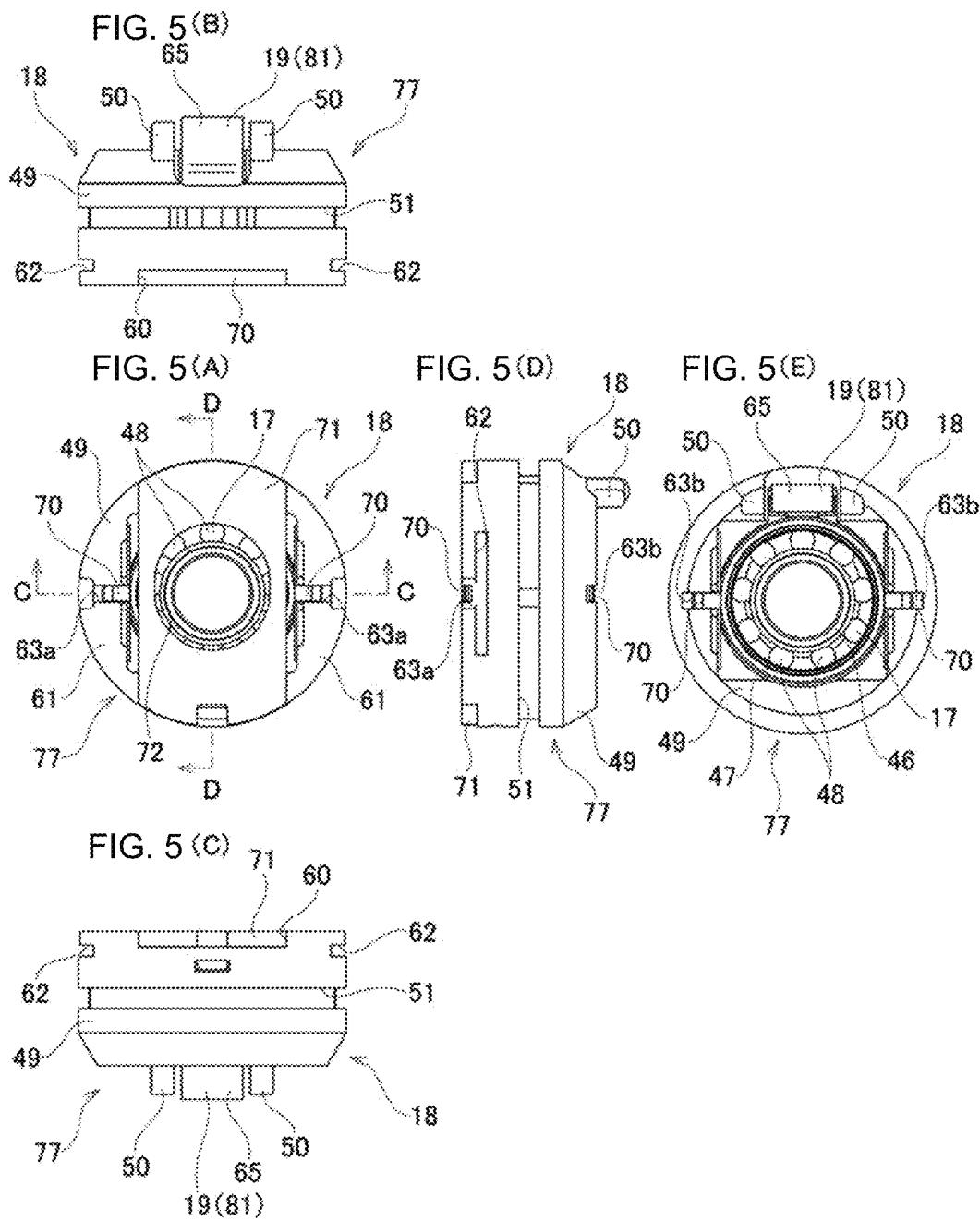
FIG. 5(A) is a front view of the guide assembly of the first example as viewed from the tip end side in the axial direction of the worm.
FIG. 5(B) is a plan view thereof.
FIG. 5(C) is a bottom view thereof.
FIG. 5(D) is a right-side view thereof.
FIG. 5(E) is a rear view thereof.
Figure 6:
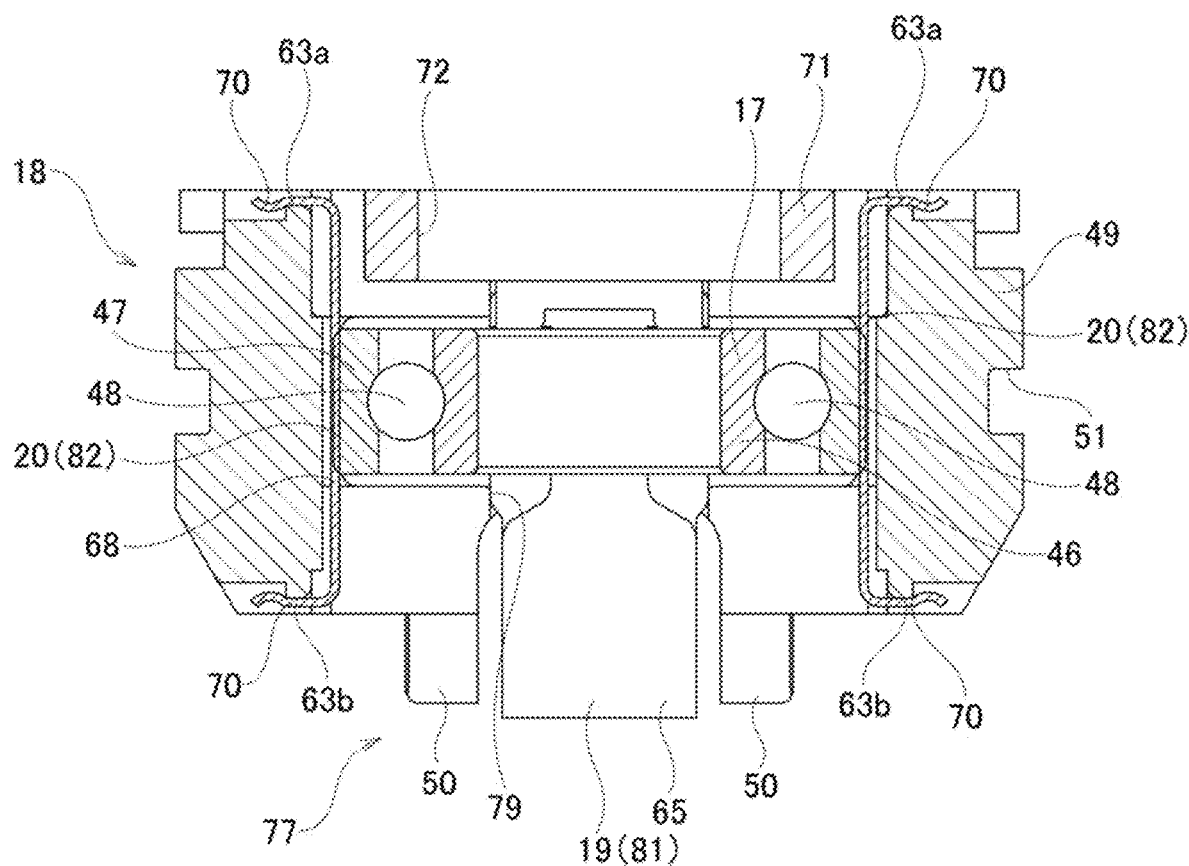
FIG. 6 is a cross-sectional view taken along section C-C in FIG. 5(A).
Figure 7:
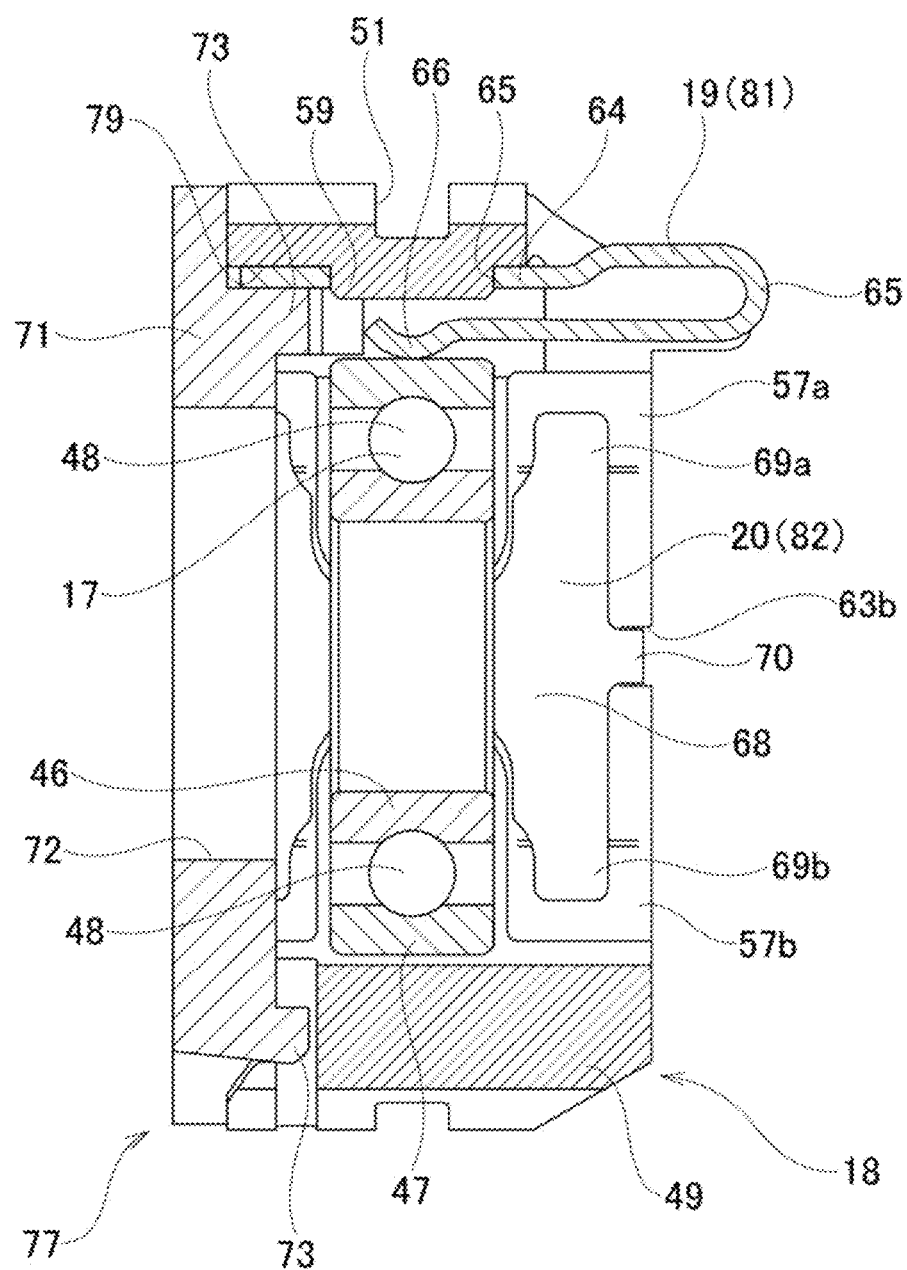
FIG. 7 is a cross-sectional view taken along section D-D in FIG. 5(A).
Figure 8:
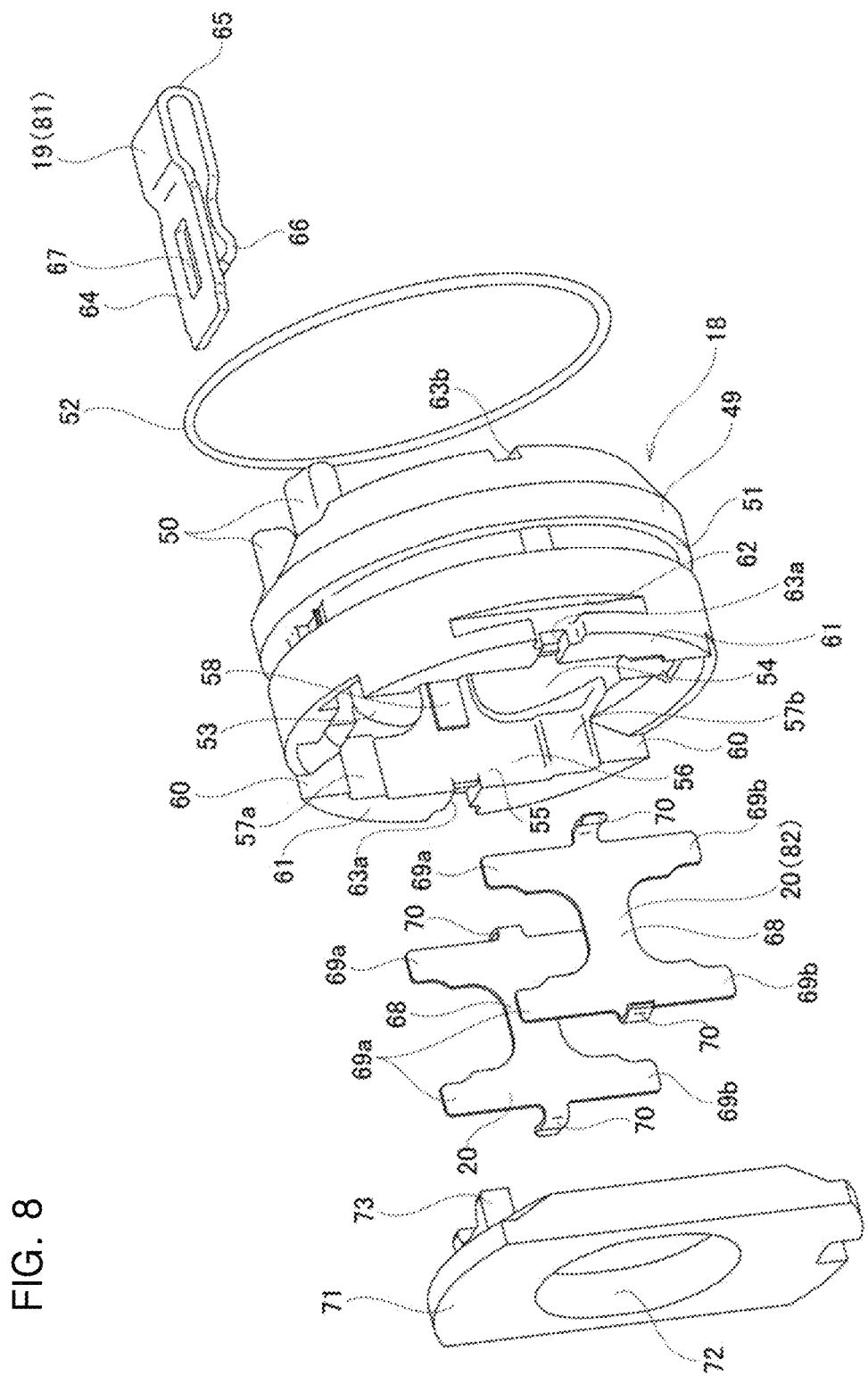
FIG. 8 is an exploded perspective view of the guide assembly of the first example.
Figure 9B:
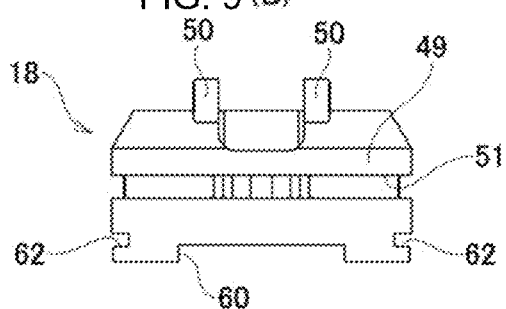
FIG. 9(B) is a plan view thereof.
Figure 9A:
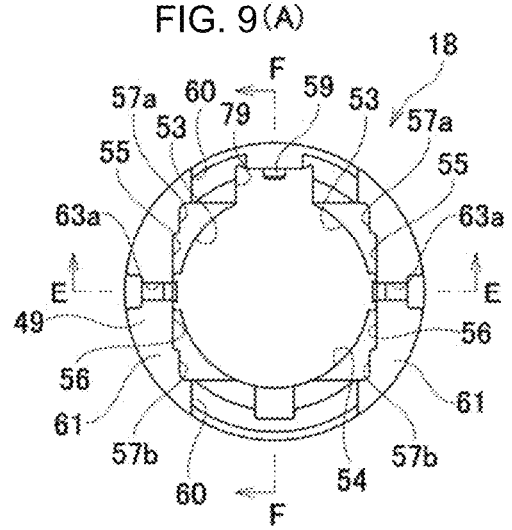
FIG. 9(A) is a front view of the guide member of the guide assembly of the first example as viewed from the tip end side in the axial direction of the worm.
Figure 9D:
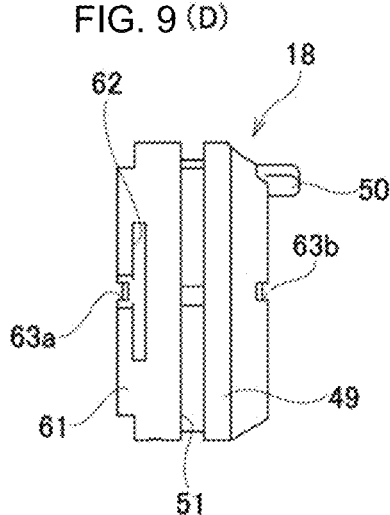
FIG. 9(D) is a right-side view thereof.
Figure 9C:
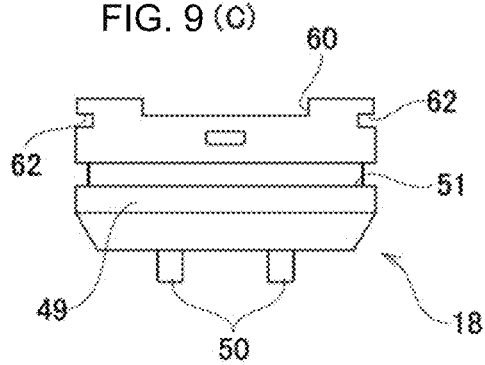
FIG. 9(C) is a bottom view thereof.
Figure 10:
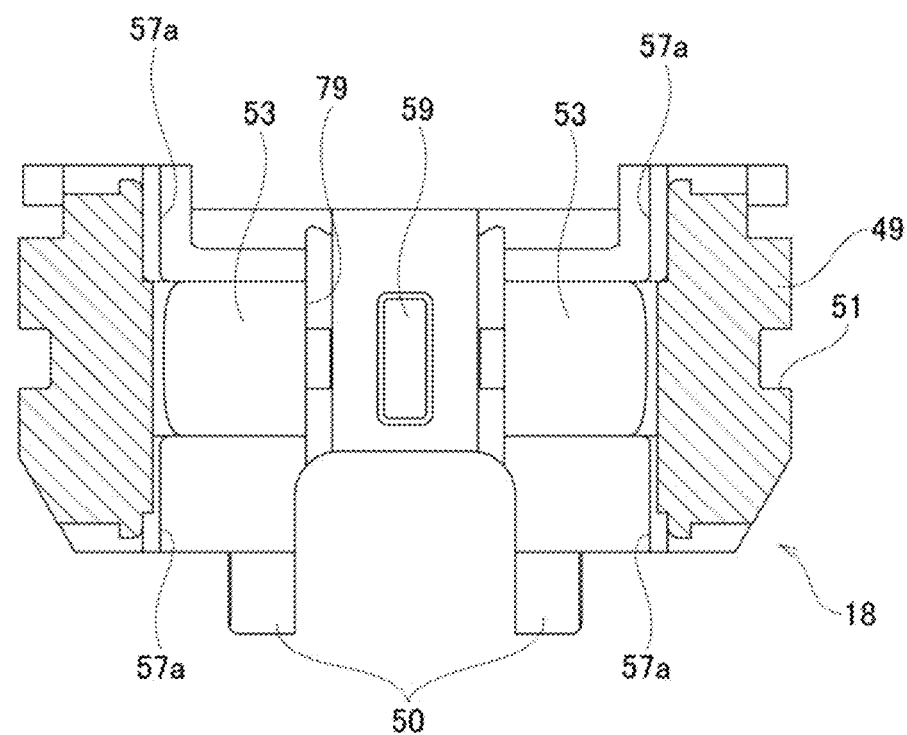
FIG. 10 is a cross-sectional view taken along section E-E in FIG. 9(A).
Figure 11:
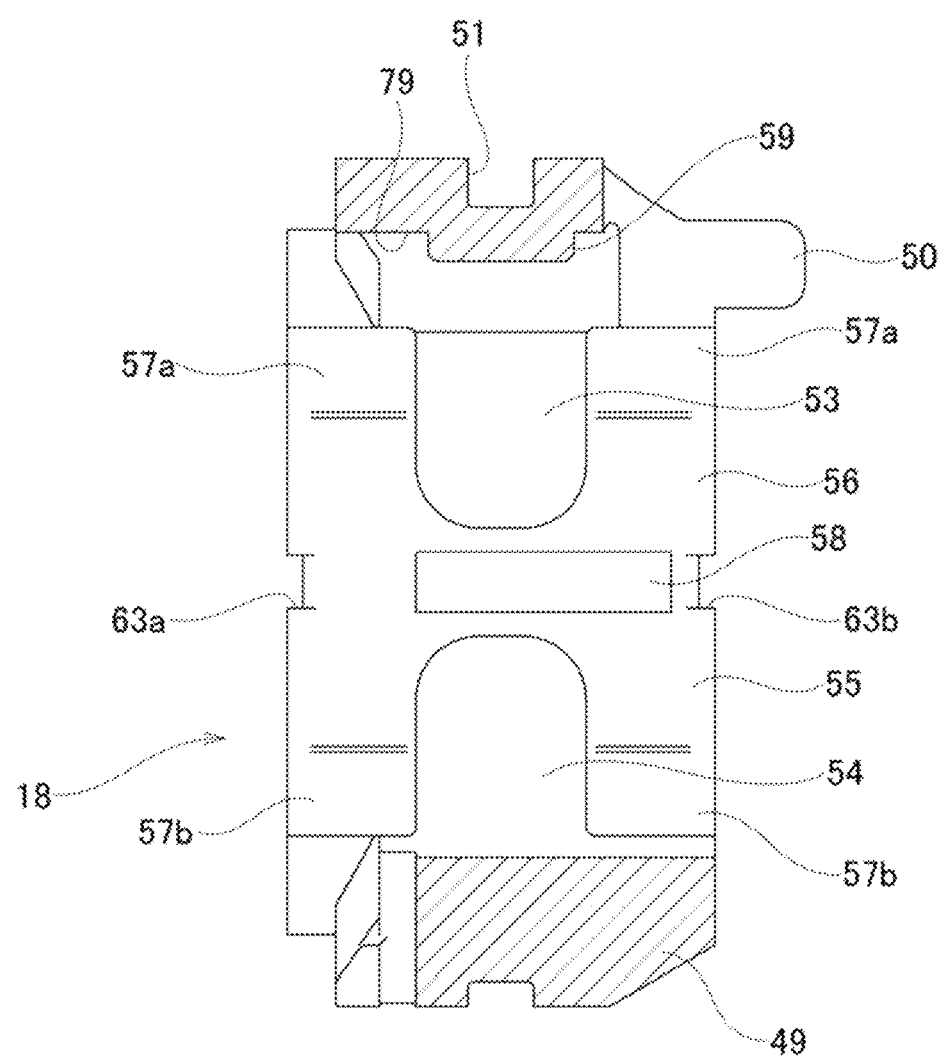
FIG. 11 is a cross-sectional view taken along section F-F in FIG. 9(A).
Figures 12A, 12B, 12C, 12D:
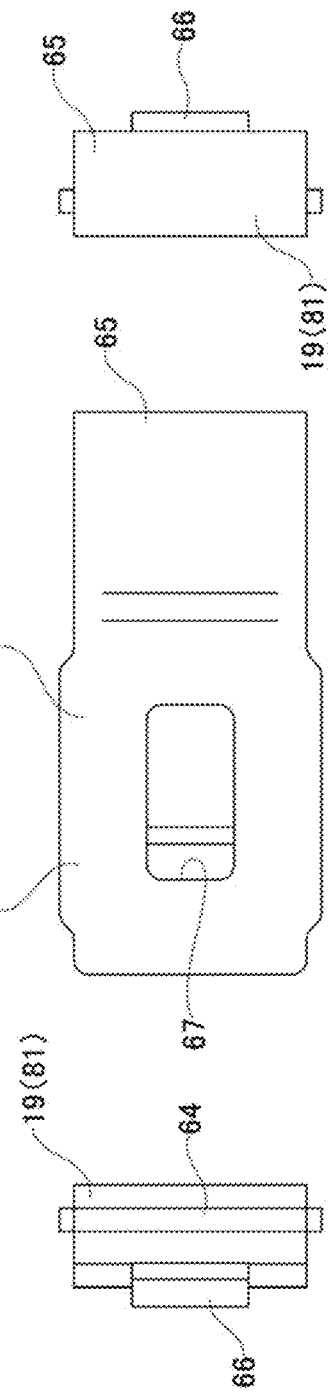
FIG. 12(B) is a front view thereof.
FIG. 12(C) is a left-side view thereof.
FIG. 12(D) is a right-side view thereof.
Figure 13C:
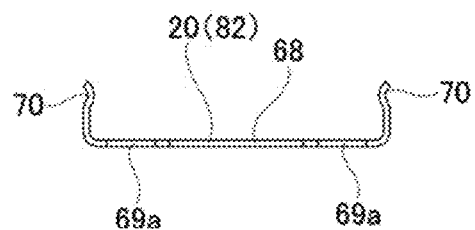
FIG. 13(C) is a plan view thereof.
Figures 13A, 13B, 13D:
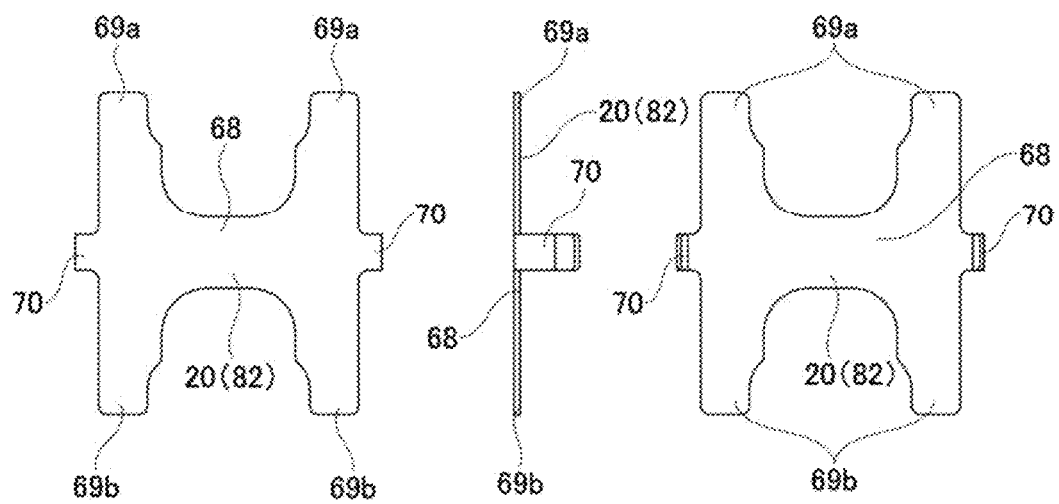
FIG. 13(A) is a front view of a holding leaf spring of the guide assembly of the first example.
FIG. 13(B) is a right-side view thereof.
FIG. 13(D) is a rear view thereof.
Figure 14:
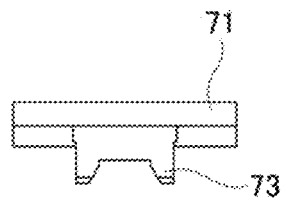
FIG. 14(A) is a rear view of the cover of the guide assembly of the first example as viewed from the base-end side in the axial direction of the worm.
FIG. 14(B) is a plan view thereof.
FIG. 14(C) is a bottom view thereof.
FIG. 14(D) is a right-side view thereof.
Figure 14:
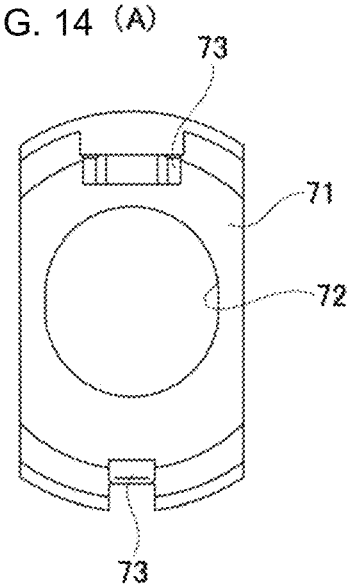
Figure 14:
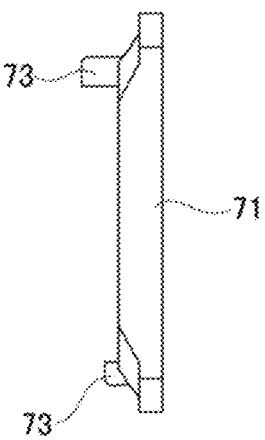
Figure 14:
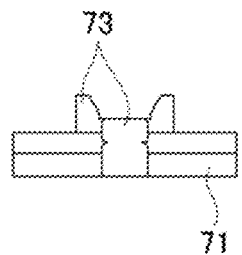
Figure 15:
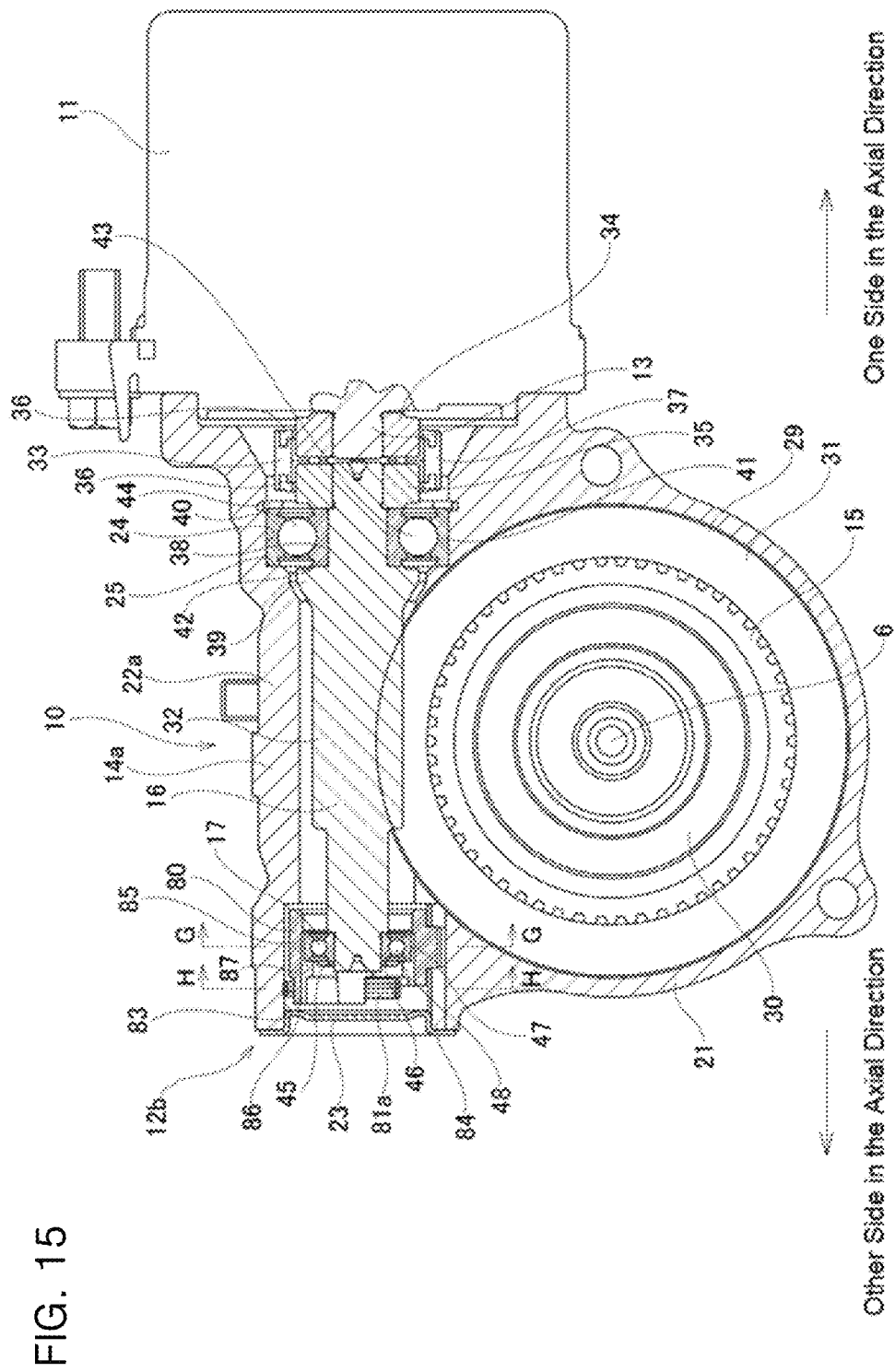
FIG. 15 is a view similar to FIG. 2, and illustrates an electric assist device of a second example of the present invention.
Figure 16:
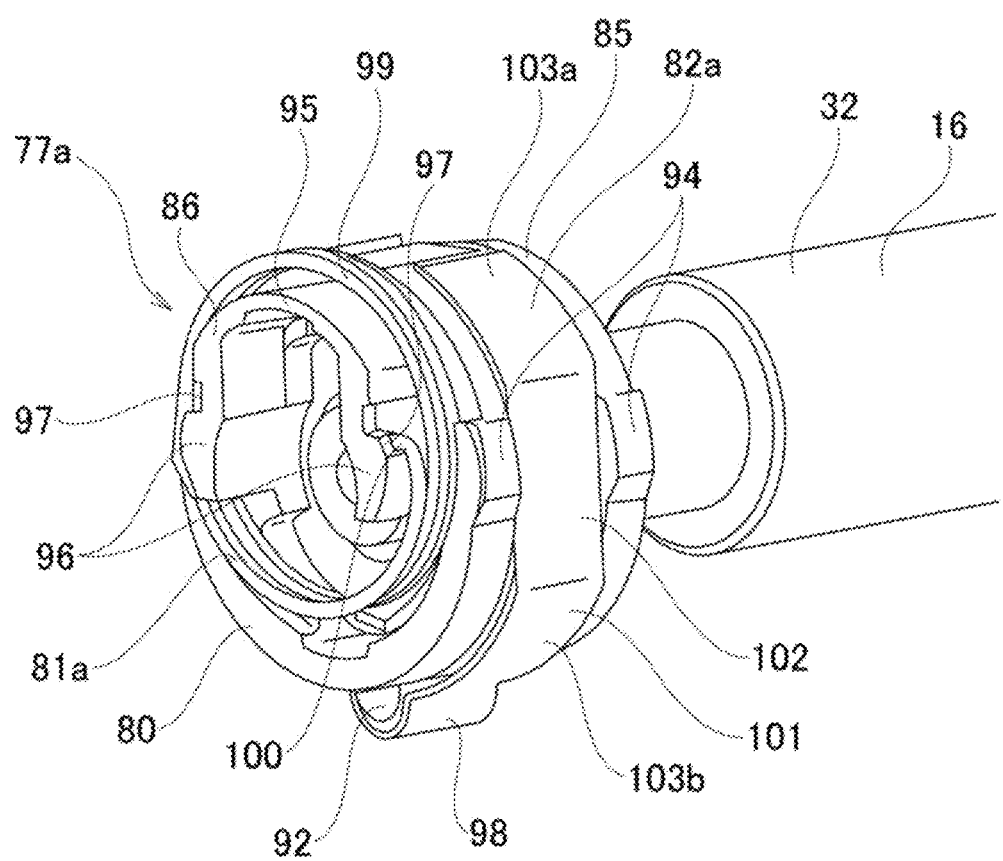
FIG. 16 is a perspective view of the guide assembly and the tip end portion of the worm of the worm reducer of the electric assist device of the second example.
Figure 17:
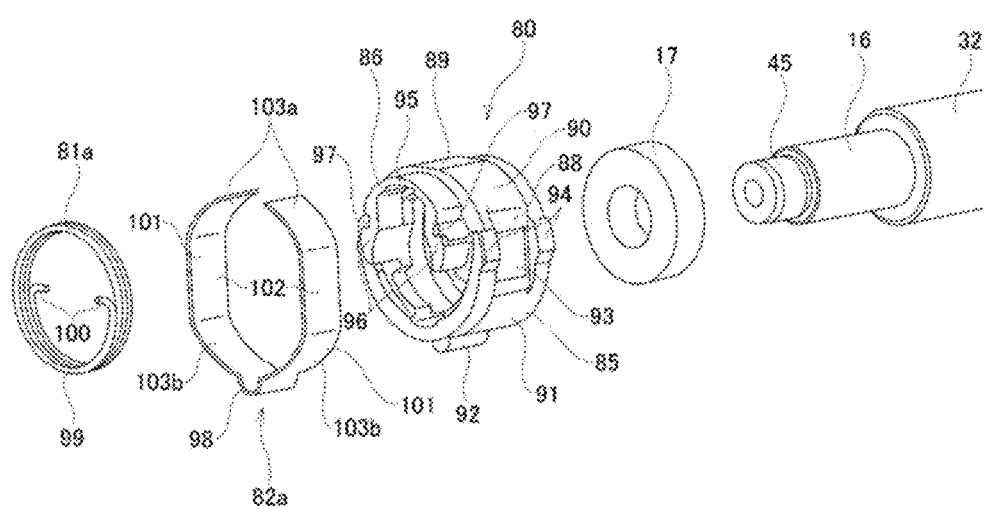
FIG. 17 is an exploded perspective view of the guide assembly and the tip end portion of the worm of the second example.
Figure 18:
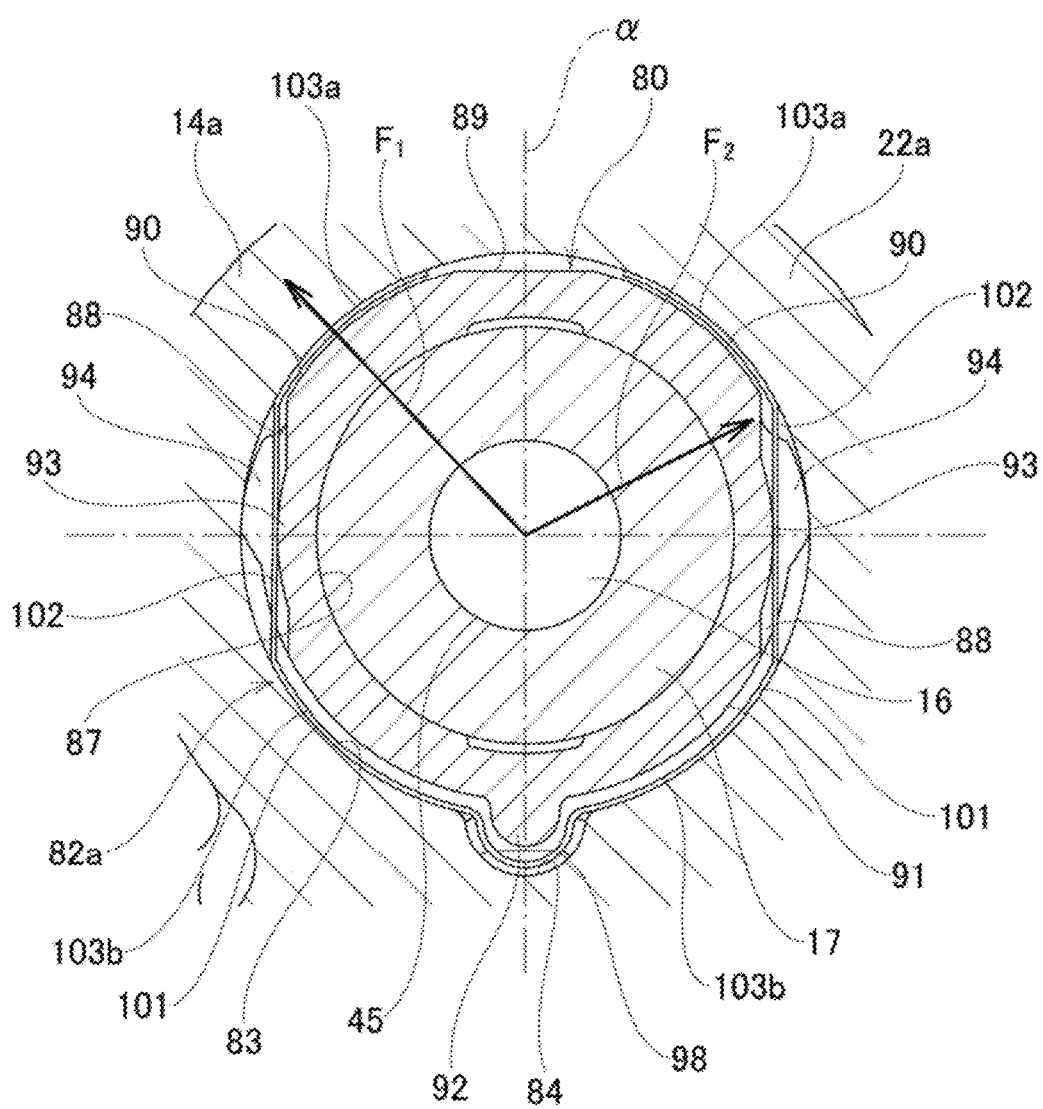
FIG. 18 is a cross-sectional view taken along section G-G in FIG. 15.
Figure 19:
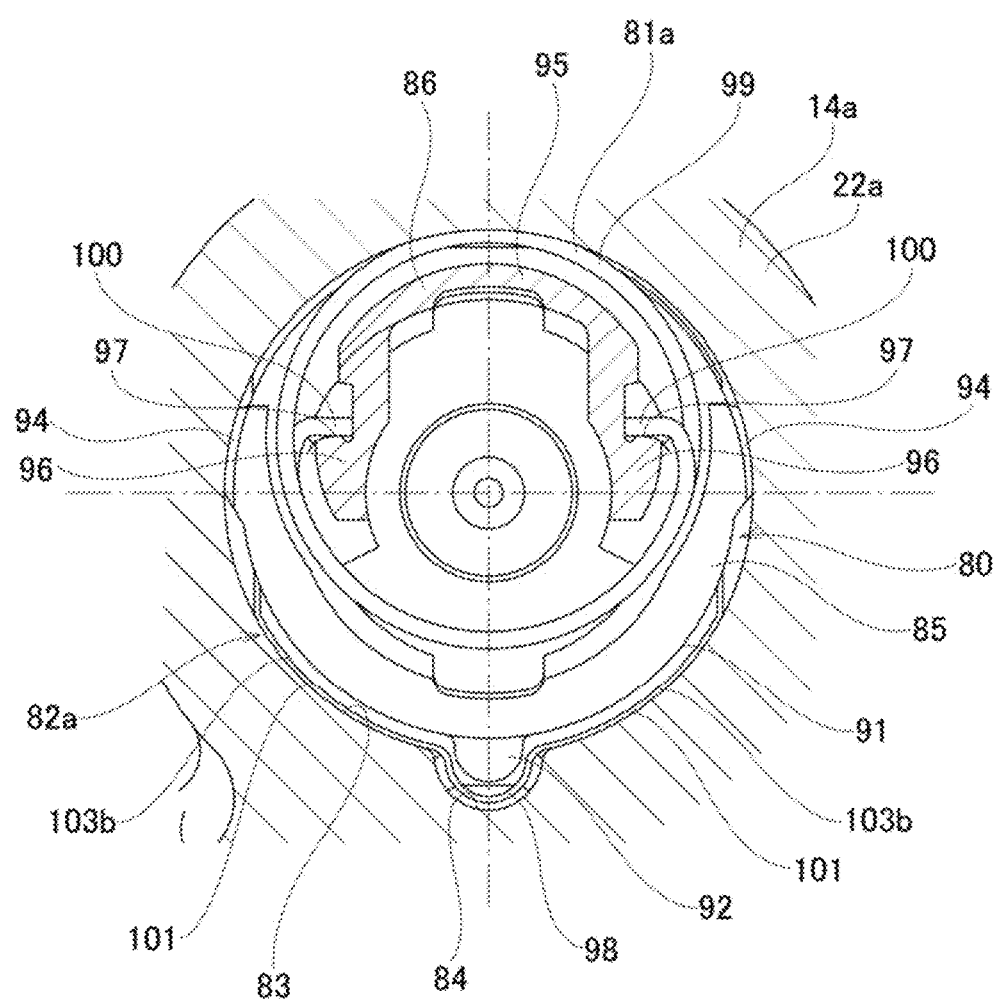
FIG. 19 is a cross-sectional view taken along section H-H in FIG. 15.

The elastic holding means 82 elastically holds the outer ring 47 of the support bearing 17 from both sides in the second direction (left-right direction in FIGS. 3, 5(A) and 6) orthogonal to the first direction (up-down direction in FIGS. 2, 3, 5(A) and 7) which is a biasing direction by the elastic biasing means 81 (pressing leaf spring 19) and the center axis of the worm housing portion 22. In this example, the elastic holding means 82 comprises a pair of holding leaf springs 20 that are arranged on both side portions in the second direction in a portion between the outer ring 47 and the guide member 18.

The guide member 18 is made of synthetic resin, and includes a cylindrical main body portion 49 and a pair of engaging convex portions 50 that protrude toward the one side in the axial direction from two positions separated in the second direction located on the side far from the worm wheel 15 in the first direction of the one side surface in the axial direction of the main body portion 49.

The guide member 18 includes a locking groove 51 having a rectangular cross-sectional shape on the outer circumferential surface of the main body portion 49 over the entire circumference. The main body portion 49 is internally fitted within the guide support portion 26 of the worm housing portion 22 in a state where the elastic ring 52 is locked in the locking groove 51. In this example, the elastic compression amount of the elastic ring 52 at a portion on the side close to the worm wheel 15 is larger than the elastic compression amount at a portion on the side far from the worm wheel 15. As a result, more specifically, the center axis of the locking groove 51 is offset from the center axis of the main body portion 49 toward the side close to the worm wheel 15 in the first direction. Due to this, looseness of the guide member 18 is suppressed by elastically biasing the guide member 18 toward the side far from the worm wheel 15 in the first direction and pressing a portion on the side far from the worm wheel 15 of the outer circumferential surface of the main body portion 49 against the guide support portion 26. In this example, the elastic ring 52 is configured by an O-ring having a circular cross-sectional shape in a free state before being locked in the locking groove 51. However, the cross-sectional shape of the elastic ring 52 is not limited to a circle, but may be an ellipse, a rectangle or the like.

The main body portion 49 includes bearing surface portions 53 having a partial cylindrical surface shape at two positions separated in the circumferential direction in a portion on the side far from the worm wheel 15 in the first direction of the inner circumferential surface of the middle section in the axial direction. Each of the bearing surface portions 53 has a radius of curvature equal to or slightly larger than the radius of curvature of the outer circumferential surface of the outer ring 47 of the support bearing 17. Furthermore, the main body portion 49 has a concave curved surface portion 54 having a substantially semi-cylindrical surface shape in a portion on the side close to the worm wheel 15 in the first direction of the inner circumferential surface of the middle section in the axial direction. The concave curved surface portion 54 has a radius of curvature equal to or slightly larger than the radius of curvature of the outer circumferential surface of the outer ring 47 of the support bearing 17.

The main body portion 49 includes engaging surface portions 55 for arranging the holding leaf springs 20 on a pair of inside surfaces of the inner circumferential surface facing each other in the second direction and having a substantially H-shape when viewed from the second direction. Each of the engaging surface portions 55 includes a base portion 56 having a flat-surface shape orthogonal to the second direction, pedestal surface portions 57a, 57b that are arranged at four corners of portions on both sides in the axial direction sandwiching the bearing surface portion 53 and portions on both sides in the axial direction sandwiching the concave curved surface portion 54 so as to protrude from the base portions 56, and a holding surface portion 58 that protrudes from the center and the vicinity of the center of the base portions 56. Each of the pedestal surface portions 57a, 57b exists on the same imaginary flat plane orthogonal to the second direction. The amount of protrusion of the pedestal surface portions 57a, 57b from the base portions 56 is larger than the amount of protrusion of the holding surface portions 58 from the base portions 56.

The main body portion 49 includes a locking concave portion 79 which is recessed toward the outside in the radial direction (the side far from the worm wheel 15 in the first direction) in a portion between the bearing surface portions 53 in the circumferential direction which is an end portion of the inner circumferential surface of the middle section in the axial direction on the side far from the worm wheel 15 in the first direction, and a locking convex portion 59 protruding toward the side close to the worm wheel 15 in the first direction on the bottom surface of the locking concave portion 79. The end portions on both sides in the axial direction of the locking concave portion 79 are open on both side surfaces in the axial direction of the main body portion 49.

The main body portion 49 has notch portions 60 at end portions on both sides in the first direction of the other side surface in the axial direction, and has side wall portions 61 having a substantially bow shape when viewed from the axial direction on both side portions in the second direction that are portions shifted in the circumferential direction from the notch portions 60. Moreover, the main body portion 49 has concave grooves 62 extending in the first direction in portions on both sides in the second direction of the outer circumferential surface of portion on the other side in the axial direction. Furthermore, the main body portion 49 has locking notches 63a, 63b at end portions on both sides in the second direction on both side surfaces in the axial direction that penetrate these portions in the radial direction. Of the locking notches 63a, 63b, the locking notches 63a provided on the other side surfaces in the axial direction penetrate the center portions of the side wall portions 61 in the radial direction and are open to the center portions of the other side surfaces in the axial direction of the concave grooves 62.

The pair of engaging convex portions 50 are arranged inside the engaging concave portion 28 of the worm housing portion 22 in a state where the main body portion 49 is internally fitted within the guide support portion 26 of the worm housing portion 22. As a result, the phase in the circumferential direction of the guide member 18 with respect to the worm housing portion 22 is determined, and the guide member 18 is prevented from rotating inside the worm housing portion 22.

As illustrated in FIGS. 12(A) to 12(D), the pressing leaf spring 19 of the elastic biasing means 81 is formed by bending a metal plate having elasticity such as a steel plate into a substantially U-shape. In this example, the pressing leaf spring 19 includes a base portion 64, a folded portion 65 which is folded back in a U-shape from an end portion of the base portion 64 on one side in the longitudinal direction (the one side in the axial direction of the guide member 18), and a curved portion 66 which is curved in a partially cylindrical shape so that the side close to the worm wheel 15 in the first direction is convex from the tip end portion of the folded portion 65 (the end portion on the other side in the axial direction of the guide member 18) in the first direction. Furthermore, the pressing leaf spring 19 has a rectangular locking hole 67 in the base portion 64.

The pressing leaf spring 19 is supported inside the guide member 18 by arranging (inserting) the base portion 64 inside the locking concave portion 79 of the guide member 18 and fitting the locking hole 67 into the locking convex portion 59. In a state of being supported inside the guide member 18, the curved portion 66 of the pressing leaf spring 19 elastically presses an end portion on the side far from the worm wheel of the outer circumferential surface of the outer ring 47 of the support bearing 17 which is arranged inside the guide member 18, and therefore the support bearing 17 is elastically biased toward the worm wheel 15 side. The folded portion 65 is arranged between the pair of engaging convex portions 50 of the guide member 18 in a state where the pressing leaf spring 19 is supported inside the guide member 18.

As illustrated in FIGS. 13(A) to 13(D), each of the holding leaf springs 20 is obtained by punching and molding a metal plate having elasticity such as a steel plate into a substantially H-shape. More specifically, each of the holding leaf springs 20 is formed in a substantially flat plate shape as a whole, and includes a base portion 68, four arm portions 69a, 69b that extend in the first direction from end portions on both sides in the longitudinal direction (axial direction of the guide member 18) of edges on both sides in the first direction of the base portion 68, and a pair of locking pieces 70 that are bent from edges on both sides in the longitudinal direction (axial direction of the guide member 18) of the base portion 68 in a direction away from the support bearing 17 (outside in the radial direction of the guide member 18) in a plate thickness direction of the base portion 68. By bringing the four arm portions 69a, 69b into contact with the pedestal surface portions 57a, 57b of the engaging surface portions 55 and by hooking the locking pieces 70 on the locking notches 63a, 63b, the holding leaf springs 20 are supported inside the guide member 18. In this manner, the outer ring 47 of the support bearing 17 is elastically held from both sides in the second direction by the pair of holding leaf springs 20 that are supported in potions on both sides in the second direction of the inner circumferential surface of the guide member 18. In a state where the holding leaf springs 20 are supported inside the guide member 18, the bearing surface portion 53 projects from between the arm portions 69a (distal side arm portions) of the four arm portions 69a, 69b that are on the side far from the worm wheel 15, and the concave curved surface portion 54 projects from between the arm portions 69b (proximal side arm portions) that are on the side close to the worm wheel 15. That is, the arm portions 69a on the side far from the worm wheel 15 are arranged on both sides of the bearing surface portion 53 in the axial direction of the guide member 18, and the arm portions 69b on the side close to the worm wheel 15 are arranged on both sides of the concave curved surface portion 54 in the axial direction of the guide member 18.

The worm reducer 12a of this example further includes a cover 71 which is supported by the opening on the other side in the axial direction of the guide member 18. As illustrated in FIGS. 14(A) to 14(D), the cover 71 has a substantially oval end surface shape when viewed from the axial direction of the guide member 18. The cover 71 has a circular hole 72 in the center portion, and has locking claws 73 that protrude in the axial direction of the guide member 18 in portions on both sides in the first direction of the one side surface in the axial direction of the guide member 18. However, the circular hole 72 may be omitted. The cover 71 is supported by the guide member 18 by hooking the locking claws 73 on an end portion on the other side in the axial direction of the main body portion 49 in a state of being arranged between the pair of side wall portions 61 of the main body portion 49.

When assembling the worm reducer 12a, the guide assembly 77 as illustrated in FIGS. 4(A) to 5(E) is formed by supporting the cover 71 to the opening on the other side in the axial direction of the guide member 18 after arranging the pressing leaf spring 19 and the pair of holding leaf springs 20 and the support bearing 17 inside the guide member 18. Then, by inserting (press-fitting) the guide assembly 77 between the guide support portion 26 of the worm housing portion 22 and the small-diameter tubular portion 45 of the worm 16, the tip end portion of the worm 16 is rotatably supported inside the guide support portion 26 in a state of being applied elasticity toward the worm wheel 15 side. After inserting the guide assembly 77 between the guide support portion 26 of the worm housing portion 22 and the small-diameter tubular portion 45 of the worm 16, the retaining ring 78 is locked in an end portion on the other side in the axial direction of the guide support portion 26. As a result, the guide assembly 77 is prevented from being displaced to the other side in the axial direction, and the cover 71 is prevented from falling off (dropping) from the guide member 18.

In the electric assist device 10 of this example, the small-diameter tubular portion 45 provided at the tip end portion of the worm 16 is supported with respect to the guide support portion 26 of the worm housing portion 22 through the support bearing 17 and the guide member 18 so as to be able to rotate freely and to move away from and close to the worm wheel 15. Furthermore, the support bearing 17 is elastically biased toward the worm wheel 15 side in the first direction by the pressing leaf spring 19 of the elastic biasing means 81. As a result, backlash between the worm teeth 32 and the wheel teeth 29 may be suppressed.

In the electric assist device 10 of this example, the support bearing 17 is elastically held from both sides in the second direction by the pair of holding leaf springs 20 of the elastic holding means 82. As a result, even when the rotational direction of the worm wheel 15 supported and fixed to the steering shaft 6 is changed due to the driver operating the steering wheel 2, the tip end portion of the worm 16 may be prevented from being displaced in the second direction.

When torque is transmitted from the worm 16 to the worm wheel 15 by supplying power to the electric motor 11, an engaging reaction force is applied to the worm 16 from the area of engagement between the wheel teeth 29 and the worm teeth 32. This engaging reaction force includes not only a component related to the first direction but also a component related to the second direction orthogonal to the first direction. The direction of the component related to the second direction becomes opposite depending on whether the worm 16 rotates in one direction or in the other direction. In other words, when torque is transmitted between the worm 16 and the worm wheel 15, as illustrated in FIG. 3, an engaging reaction force F1 or F2 inclined with respect to the first direction is applied to the tip end portion of the worm 16 according to the rotational direction of the worm 16.

When transmitting torque between the worm wheel 15 and the worm 16, if the component related to the first direction of the engaging reaction force F1 or F2 applied to the worm 16 becomes larger than the elastic biasing force by the pressing leaf spring 19, the tip end portion of the worm 16 displaces in the direction away from the worm wheel 15 in the first direction. In this example, when the tip end portion of the worm 16 displaces in the direction away from the worm wheel 15, the outer circumferential surface of the outer ring 47 of the support bearing 17 comes into contact with the bearing surface portions 53 provided on the inner circumferential surface of the guide member 18, and the outer circumferential surface of the guide member 18 is pressed against the guide support portion 26 of the worm housing portion 22, so that the engaging reaction force F1 or F2 is supported. In this example, the bearing surface portions 53 are provided at two positions separated in the circumferential direction in portions on the side far from the worm wheel 15 of the inner circumferential surface of the guide member 18. As a result, regardless of the rotational direction of the worm 16, the contact portion between the outer circumferential surface of the outer ring 47 and the bearing surface portion 53 may be located in the direction of the engaging reaction force F1 or F2, and the engaging reaction force F1 or F2 may be efficiently supported by the housing 14.

Each of the pair of holding leaf springs 20 has a substantially H-shape and is formed into a substantially flat plate shape. Therefore, the pair of holding leaf springs 20 may be manufactured at low cost, and the assemblability is improved since it is not necessary to consider the directionality with respect to the first direction when attaching the pair of holding leaf springs 20 to the guide member 18. However, the elastic holding means 82 that holds the support bearing 17 from both sides in the second direction may be integrally formed as a whole. In other words, the elastic holding means 82 may also be composed of a member having a structure in which the end portions of the pair of holding leaf springs 20 on the side close to the worm wheel 15 in the first direction are connected to each other.

Since the cover 71 is supported by the opening on the other side in the axial direction of the guide member 18, even in a state before the guide assembly 77 is assembled in a predetermined position, the support bearing 17, the pressing leaf spring 19, and the pair of holding leaf springs 20 are prevented from falling off from the inside of the guide member 18. Accordingly, the support bearing 17, the guide member 18, the pressing leaf spring 19, the pair of holding leaf springs 20, and the cover 71 may be integrally treated as a sub-assembly, and the assemblability of the worm reducer 12a may be improved. In this example, in a state where the guide assembly 77 is arranged between the guide support portion 26 of the worm housing portion 22 and the small-diameter tubular portion 45 of the worm 16, the guide assembly 77 is prevented from being displaced to the other side in the axial direction by the retaining ring 78 which is locked to the end portion on the other side in the axial direction of the guide support portion 26, and the cover 71 is prevented from falling off from the guide member 18. Therefore, even when a force directed to the other side in the axial direction is applied to the worm 16 due to the transmission of torque between the worm wheel 15 and the worm 16, the worm 16 is prevented from being excessively displaced to the other side in the axial direction, and the area of engagement between the wheel teeth 29 and the worm teeth 32 is prevented from being locked.

The worm reducer 12a of this example has a structure in which the center axis of the worm wheel 15 and the center axis of the worm 16 are orthogonal to each other when viewed from the first direction. However, the present invention may be also applied to a worm reducer having a structure in which the center axis of the worm wheel and the center axis of the worm obliquely intersect (make an acute angle) when viewed from the first direction.

In this example, the pressing leaf spring 19 of the elastic biasing means 81 and the pair of holding leaf springs 20 of the elastic holding means 82 are arranged between the guide member 18 arranged inside the worm housing portion 22 of the housing 14 without any looseness and the outer ring 47 of the support bearing 17, however, the pressing leaf spring 19 may be arranged between the worm housing portion 22 and the outer ring 47 of the support bearing 17. Alternatively, the outer ring 47 of the support bearing 17 may be directly internally fitted within the inner circumferential surface of the worm housing portion 22 so as to be able to displace in the first direction, and the elastic biasing means 81 and the elastic holding means 82 may be arranged between the worm housing portion 22 and the outer ring 47 of the support bearing 17.

Second Example

FIGS. 15 to 19 illustrate a second example of the present invention. The worm reducer 12b of this example is different from the worm reducer of the first example in the structure of an elastic biasing means 81a which elastically biases the support bearing 17 externally fitted to the small-diameter tubular portion of the worm 16 toward the worm wheel 15 side and in the structure of an elastic holding means 82a which holds the support bearing 17 from both sides in the second direction. In the following description, the worm reducer 12b of this example will be explained focusing on portions that are different from the worm reducer 12a of the first example.

The worm reducer 12b of this example includes a housing 14a, a worm wheel 15, a worm 16, a support bearing 17, a holder member (guide member) 80, an elastic biasing means 81a, and an elastic holding means 82a.

The housing 14a includes a wheel housing portion 21 and a worm housing portion 22a having the center axis located in a skew position with respect to the center axis of the wheel housing portion 21.

The worm housing portion 22a has a cylindrical surface portion 24 having a cylindrical surface shape on the inner circumferential surface of a portion on the one side in the axial direction, and has a stepped portion 25 facing the one side in the axial direction at an end portion on the other side in the axial direction of the cylindrical surface portion 24. The worm housing portion 22a has a holder holding portion 83 on the inner circumferential surface of a portion on the other side in the axial direction, and has an engaging portion 84 on the housing side which is concave outward in the radial direction at an end portion on the wheel housing portion 21 side (lower end portion in FIGS. 18 and 19) of the holder holding portion 83. The holder holding portion 83 is formed of a cylindrical surface except for a potion where the engaging portion 84 on the housing side is located.

The worm wheel 15 is supported and fixed around the front-end portion of the steering shaft 6 rotatably supported inside the wheel housing portion 21 so as to rotate integrally with the steering shaft 6.

The base-end portion of the warm 16 is connected to the output shaft 13 of the electric motor 11 through a torque transmission joint 33 so as to be able to transmit torque, and the fitting tubular portion 38 provided in a portion on the one side in the axial direction of the worm 16 is rotatably supported by the ball bearing 40 with respect to the cylindrical surface portion 24 of the worm housing portion 22.

The inner ring 46 of the support bearing 17 is externally fitted to the small-diameter tubular portion 45 provided at the tip end portion of the worm 16.

The holder member (guide member) 80 includes a tubular portion 85 and a protruding portion 86 having a substantially U-shape which protrudes from the other side surface in the axial direction of the tubular portion 85 toward the other side in the axial direction. The holder member 80 is preferably made of synthetic resin or metal having sufficient strength and rigidity.

The tubular portion 85 has a bearing support portion 87 on the inner circumferential surface to which the outer ring 47 of the support bearing 17 is internally fitted and retained. The tubular portion 85 has a pair of flat surface portions 88 on the holder side which is orthogonal to the center axis of the worm wheel 15 and is provided at two positions of the outer circumferential surface in the middle section in the axial direction that are opposite from each other in the radial direction, parallel to the first direction (up-down direction in FIGS. 15 to 19), which is the biasing direction of the holder member 80 by the elastic biasing means 81a, and symmetrical with respect to the imaginary flat plane a including the center axis of the worm 16. The tubular portion 85 has a non-contact portion 89 which has a flat-surface shape and is orthogonal to the imaginary flat plane a at an end portion on the side far from the worm wheel 15 (upper end portion in FIGS. 18 and 19) of the outer circumferential surface. However, when a coil spring is used as the elastic biasing means 81a as in this example, the non-contact portion 89 may be omitted. The tubular portion 85 has partially cylindrical surface portions 90 on the distal side that connect end portions on the side far from the worm wheel 15 in the circumferential direction of the pair of flat surface portions 88 on the holder side and end portions of the non-contact portion 89, and a partially cylindrical surface portion 91 on the proximal side that connects end portions on the side close to the worm wheel 15 in the circumferential direction of the pair of flat surface portions 88 on the holder side. The tubular portion 85 has an engaging portion 92 on the holder side protruding outward in the radial direction at an end portion on the side close to the worm wheel 15 (lower end portion in FIGS. 18 and 19) of the partially cylindrical surface portion 91 on the proximal side.

The tubular portion 85 has first convex portions 93 that protrude from the flat surface portions 88 on the holder side and respectively have a tip end surface having a partially cylindrical surface shape, and has two pairs of second convex portions 94 arranged at two portions on the outer circumferential surface that are symmetrical with respect to the imaginary flat plane a, each pair of which is located at end portions on both sides in the axial direction sandwiching the middle section in the axial direction provided with the flat surface portions 88 on the holder side. The positions in the circumferential direction of the second convex portions 94 are on the side closer to the worm when 15 than the partially cylindrical surface portions 90 on the distal side, and slightly shifted to the side far from the worm wheel 15 from the center positions in the circumferential direction of the first convex portions 93. The tip end surfaces of the second convex portions 94 (outside surfaces in the radial direction) are respectively composed of a partially cylindrical surfaces closely opposed to the holder holding portion 83 of the housing 14a in a state where an engaging reaction force is not applied to the worm 16 from the area of engagement between the wheel teeth 29 and the worm teeth 32, and having a radius of curvature substantially equal to the radius of curvature of the holder holding portion 83. In other words, in a state where an engaging reaction force is not applied to the worm 16 from the area of engagement between the wheel teeth 29 and the worm teeth 32, gaps exist between the tip end surfaces of the second convex portions 94 and the holder holding portion 83 of the housing 14.

The protruding portion 86 protrudes towards the other side in the axial direction from a half portion on the side far from the worm wheel 15 in a portion on the inside in the radial direction of the other side surface in the axial direction of the tubular portion 85, and has a substantially U-shaped end surface shape when viewed from the other side in the axial direction. That is, the protruding portion 86 includes a partial cylindrical portion 95 which protrudes toward the other side in the axial direction from an end portion on the side far from the worm wheel 15 in the portion on the inside in the radial direction of the other side surface in the axial direction of the tubular portion 85, and a pair of side wall portions 96 that extend toward the side close to the worm wheel 15 from both end portions in the circumferential direction of the partial cylindrical portion 95 and are arranged parallel to each other. The pair of side wall portions 96 have locking concave portions 97 which are recessed in a mutually approaching direction on the outside surfaces.

The engaging portion 92 on the holder side of the holder member 80 is engaged with the engaging portion 84 on the housing side 84 through a connecting portion 98 of the elastic holding means 82a, and thus the holder member 80 is arranged inside the holder holding portion 83 in a state where displacement in the circumferential direction is restricted. The elastic biasing means 81a gives the holder member 80 elasticity in a direction toward the worm wheel 15 side in the first direction orthogonal to the center axis of the worm wheel 15 and the center axis of the output shaft 13 of the electric motor 11. Furthermore, the elastic holding means 82a prevents the holder member 80 from rattling in the second direction (left-right direction in FIGS. 18 and 19) perpendicular to the first direction.

In this example, the elastic biasing means 81a is composed of a helical torsion spring formed by bending a metal wire. The elastic biasing means 81a includes a coil portion 99 and a pair of arm portions 100 that are bent inward in the radial direction from both end portions of the coil portion 99. With the protruding portion 86 of the holder member 80 inserted into the coil portion 99 and the pair of arm portions 100 hooked to the locking concave portions 97, the elastic biasing means 81a presses an end portion of the outer circumferential surface of the coil portion 99 on the side far from the worm wheel 15 against the holder holding portion 83. As a result, elasticity in a direction toward the worm wheel 15 side (lower side in FIGS. 18 and 19) with respect to the first direction is applied to the holder member 80.

In this example, the elastic holding means 82a is composed of a leaf spring formed by bending a metal plate having elasticity. The elastic holding means 82a includes a pair of elastic pieces 101 and a connecting portion 98 that connects end portions on the side close to the worm wheel 15 of both end portions in the circumferential direction of the pair of elastic pieces 101. The end portions on the side far from the worm wheel 15 of the both end portions in the circumferential direction of the pair of elastic pieces 101 are free ends that are not connected to any portions.

Each of the pair of elastic pieces 101 has a flat plate portion 102 arranged so as to be orthogonal to the center axis of the worm wheel 15 and partially cylindrical supported portions 103a, 103b that extend in the circumferential direction from both end portions of the flat plate portion 102. The pair of elastic pieces 101 press the outside surfaces in the radial direction of the supported portions 103a, 103b against the holder holding portion 83, so that the flat plate portions 102 are prevented from being displaced in a direction away from each other in the second direction. More specifically, by arranging the elastic holding means 82a inside the holder holding portion 83 in a state where the distance between the end portions of the pair of elastic pieces 101 on the side far from the worm wheel 15 is elastically contracted, and thus the outside surfaces in the radial direction of the supported portions 103a, 103b are pressed against the holder holding portion 83 by the elastic restoring force of the elastic holding means 82a. In this example, the curvature of the supported portions 103a on the side far from the worm wheel 15 (distal side supported portions) of the supported portions 103a, 103b is made smaller than the curvature of the partially cylindrical surface portions 90 on the distal side of the holder member 80 facing the inside surfaces in the radial direction of the supported portions 103a.

The inside surfaces in the radial direction of the flat plate portions 102 of the pair of elastic pieces 101 come in contact with tip end portions of the first convex portions 93 of the holder member 80. In other words, the holder member 80 is elastically held from both sides in the second direction between the inside surfaces in the radial direction of the flat plate portions 102 of the pair of elastic pieces 101. As a result, the holder member 80 is prevented from rattling in the second direction.

The connecting portion 98 curves in a substantially U-shape when viewed from the axial direction. In this example, the connecting portion 98 is arranged inside the engaging portion 84 on the housing side of the holder holding portion 83, and the engaging portion 92 on the holder side of the holder member 80 is arranged inside the connecting portion 98. That is, the engaging portion 92 on the holder side of the holder member 80 is engaged with the engaging portion 84 on the housing side of the guide support portion 26 through the connecting portion 98. As a result, the holder member 80 and the elastic holding means 82a are prevented from being displaced in the circumferential direction inside the holder holding portion 83.

A gap exists between the inner surface of the engaging portion 84 on the housing side and the outside surface in the radial direction of the connecting portion 98. As a result, dimensional errors of the elastic holding means 82a may be absorbed. Furthermore, a gap also exists between the inside surface in the radial direction of the connecting portion 98 and the outside surface in the radial direction of the engaging portion 92 on the holder side. Therefore, occurrence of frictional resistance between the elastic holding means 82a and the holder member 80 may be prevented, and dimensional errors of the elastic holding means 82a and the holder member 80 may be absorbed. However, the inside surface in the radial direction of the connecting portion 98 and the outside surface in the radial direction of the engaging portion 92 on the holder side may also be brought into contact with each other without a gap.

In this example as well, a guide assembly 77a may be formed by arranging the elastic biasing means 81a, the elastic holding means 82a, and the support bearing 17 to the holder member 80. Furthermore, by inserting (press-fitting) the guide assembly 77a between the holder holding portion 83 of the worm housing portion 22a and the small-diameter tubular portion 45 of the worm 16, the tip end portion of the worm 16 may be rotatably supported inside the holder holding portion 83 in a state of being applied elasticity toward the worm wheel 15 side.

In this example, the small-diameter tubular portion 45 provided at the tip end portion of the worm 16 is supported by the holder holding portion 83 of the worm housing portion 22a through the support bearing 17 and the holder member 80 so as to be able to rotate freely and move away from and close to the worm wheel 15, and the holder member 80 is elastically biased toward the worm wheel 15 side in the first direction by the elastic biasing means 81a. As a result, backlash between the worm teeth 32 and the wheel teeth 29 may be suppressed.

In this example, the holder member 80 is elastically held from both sides in the second direction by the flat plate portions 102 of the pair of elastic pieces 101 of the elastic holding means 82a. As a result, even when the rotational direction of the worm wheel 15 supported and fixed to the steering shaft 6 is changed due to the operation of the steering wheel 2 by the driver, the tip end portion of the worm 16 may be prevented from being displaced in the direction perpendicular to the biasing direction by the elastic biasing means 81a.

In this example, when the tip end portion of the worm 16 displaces in the direction away from the worm wheel 15, the partially cylindrical surface portions 90 on the distal side of the outer circumferential surface of the holder member 80 come into contact with the holder holding portion 83 of the housing 14 through the supported portions 103a on the side far from the worm wheel 15 of the supported portions 103a, 103b of the elastic holding means 82a. That is, according to this example, the contact portions between the outer circumferential surface of the holder member 80 and the holder holding portion 83 may be positioned in the direction of the engaging reaction force F1 or F2, and the engaging reaction force F1 or F2 may be efficiently supported by the housing 14.

In this example, the curvature of the supported portions 103a on the side far from the worm wheel 15 is made smaller than the curvature of the partially cylindrical surface portions 90 on the distal side. Therefore, as the magnitude (of the component related to the first direction) of the engaging reaction force F1 or F2 increases, the contact positions between the partially cylindrical surface portions 90 on the distal side and the inside surfaces in the radial direction of the supported portions 103a move to the side far from the worm wheel 15 in the circumferential direction, and the contact positions between the tip end portions of the first convex portions 93 and the inside surfaces in the radial direction of the flat plate portions 102 move to the side far from the worm wheel 15 in the first direction. In other words, the contact position between the tip end portions of the first convex portions 93 and the inside surfaces in the radial direction of the flat plate portions 102 move to the side close to the contact portions between the holder holding portion 83 and outside surfaces in the radial direction of the supported portions 103a. As a result, the spring constant of the portions of the flat plate portions 102 of the elastic holding means 82a that come into contact with the tip end portions of the first convex portions 93 may be increased, and the tip end portion of the worm 16 may be more effectively prevented from being displaced in the second direction.

Even when the curvature of the supported portions 103a on the side far from the worm wheel 15 is made larger than the curvature of the partially cylindrical surface portions 90 on the distal side, the contact portions between the tip end portions of the first convex portions 93 and the inside surfaces in the radial direction of the flat plate portions 102 are moved by the engaging reaction force F1 or F2. As a result, similar to the case where the curvature of the supported portions 103a on the side far from the worm wheel 15 is made smaller than the curvature of the partially cylindrical surface portions 90 on the distal side, the spring constant of the leaf spring of the elastic holding means 82a may be increased, and the tip end portion of the worm 16 may be more efficiently prevented from being displaced in the second direction.

When the tip end portion of the worm 16 tries to displace in the second direction and the tip end portions of the first convex portions 93 of the holder member 80 press the flat plate portions 102 of the elastic holding means 82a, the supported portions 103a of the elastic holding means 82a on the side far from the worm wheel 15 tend to deform toward inside in the radial direction. When torque is transmitted between the worm 16 and the worm wheel 15, the supported portions 103a on the side far from the worm wheel 15 are pushed toward the holder holding portion 83 by the partially cylindrical surface portions 90 on the distal side of the holder member 80 based on the engaging reaction force F1 or F2. From this aspect as well, the tip end portion of the worm 16 may be prevented from being displaced in the second direction.

The holder member 80 of this example has two pairs of second convex portions 94 arranged at two positions on the outer circumferential surface of the tubular portion 85 that are symmetrical with respect to the imaginary flat plane a, each pair of which is located at end portions on both sides in the axial direction sandwiching the middle section in the axial direction provided with the flat surface portions 88 on the holder side. Furthermore, the positions in the circumferential direction of the second convex portions 94 are made as portions on the side close to the worm wheel 15 than the partially cylindrical surface portions 90 on the distal side and are slightly shifted to the side far from the worm wheel 15 from the center positions in the circumferential direction of the first convex portions 93. Therefore, when the tip end portion of the worm 16 displaces in the direction away from the worm wheel 15 and the partially cylindrical surface portions 90 on the distal side of the holder member 80 come into contact with the holder holding portion 83 of the housing 14 through the supported portions 103a of the elastic holding means 82a on the side far from the worm wheel 15, the second convex portions 94 directly come into contact with, or come close to and face the holder holding portion 83. As a result, the tip end portion of the worm 16 may be more reliably prevented from being displaced in the second direction.

In this example, a member having a structure in which the pair of elastic pieces 101 are connected by the connecting portion 98 is used as the elastic holding means 82a, however, other structures may be adopted as long as the holder member may be held from both sides in the direction perpendicular to the biasing direction by the elastic biasing means. In other words, the elastic holding means may be configured by a pair of elastic pieces that are separate from each other and each have a flat plate portion. In this case, the pair of elastic pieces are supported inside the housing by pressing the supported portions against the inner circumferential surface of the housing in a state where the flat plate portions are arranged in the biasing direction by a biasing member, and the engaging portion on the guide side of the guide member is directly engaged with the engaging portion on the housing side. Furthermore, it is preferable to include a stopper mechanism for preventing each elastic piece from being displaced in the circumferential direction inside the housing.

In this example, each of the pair of elastic pieces 101 includes a flat plate portion 102 and partially cylindrical supported portions 103a, 103b that extend in the circumferential direction from both end portions of the flat plate portion 102, and the flat plate portion 102 is prevented from being displaced in the direction away from each other in the second direction by pressing the outside surfaces in the radial direction of the supported portions 103a, 103b against the holder holding portion 83. However, each of the pair of elastic pieces may be made to include a flat plate portion and a pair of bent portions bent at substantially right angles or acute angles from both end portions of the flat plate portion, and to provide a structure in which each of the flat plate portions are prevented from being displaced in the direction away from each other by pressing the connecting portions between the flat plate portions and the bent portions against the holder holding portion. In other words, the connecting portions may be pressed against the holder holding portion and a gap may be provided between the outside surfaces in the radial direction of the bent portions and the guide support portion. In this case, the connecting portion corresponds to the supported portion. The configuration and operational effects of the other parts are the same as those of the first example.

Third Example

Figure 20:
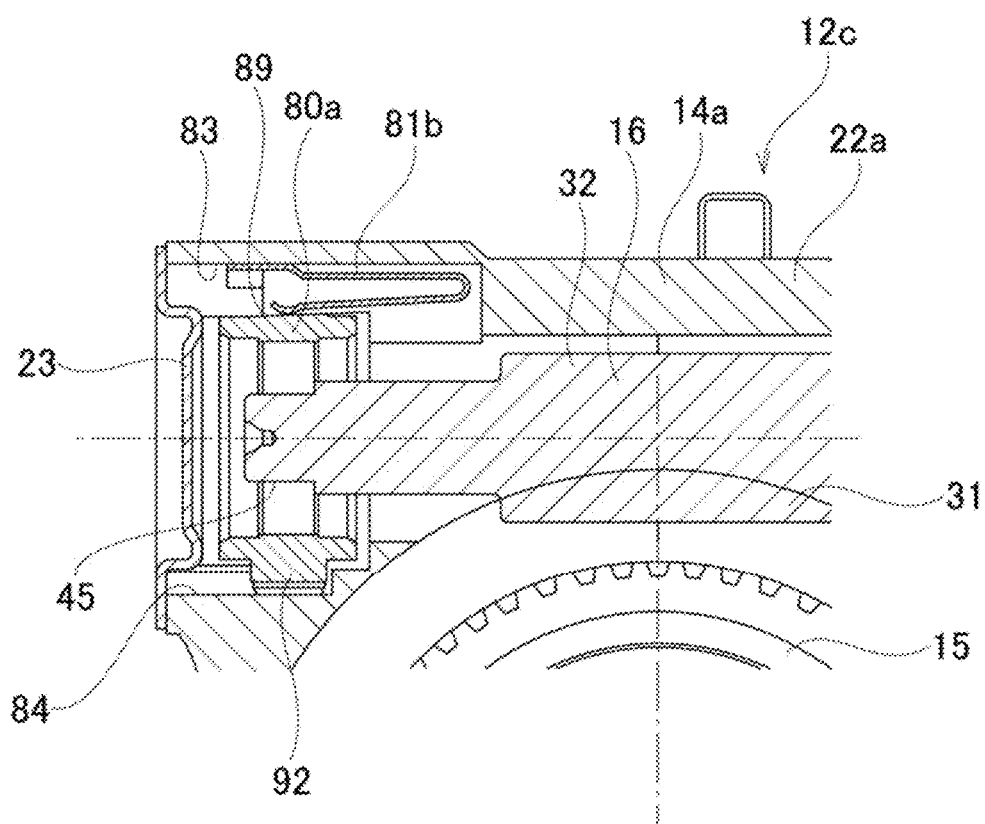
FIG. 20 is an enlarged cross-sectional view of the major parts of the electric assist device of a third example of the present invention.
Figure 21:
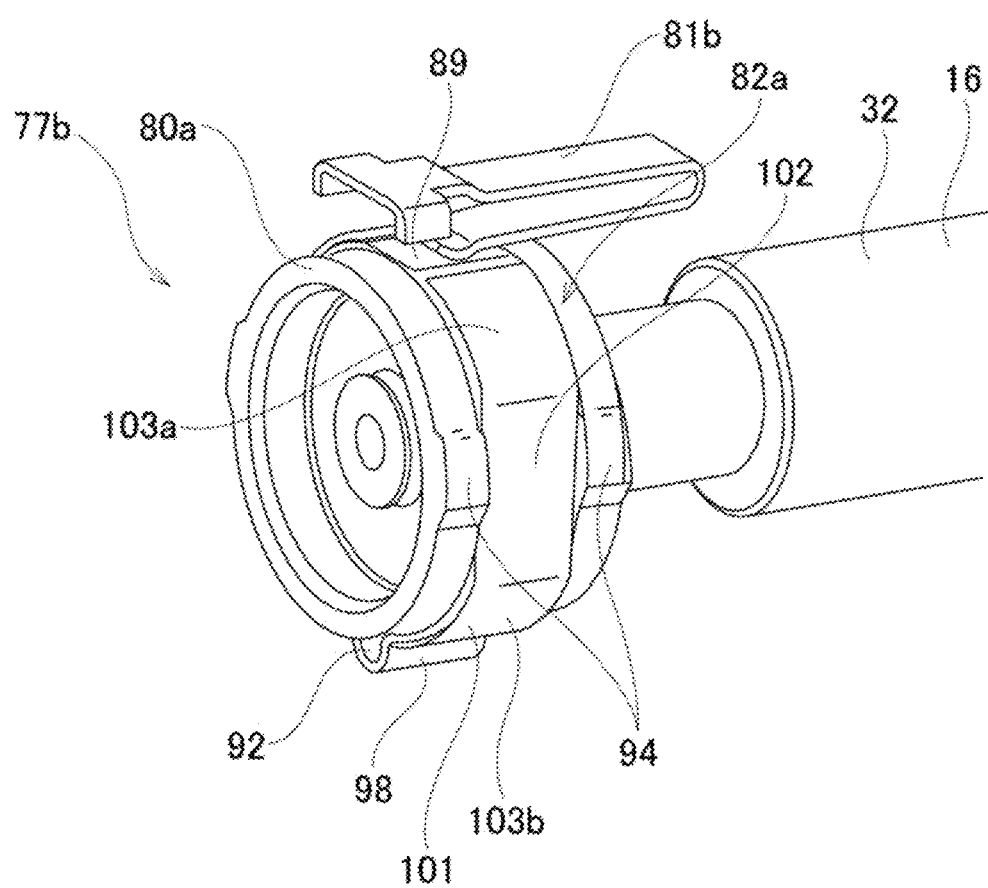
FIG. 21 is a perspective view of the guide assembly and the tip end portion of the worm of the worm reducer of the electric assist device of the third example.
Figure 22:
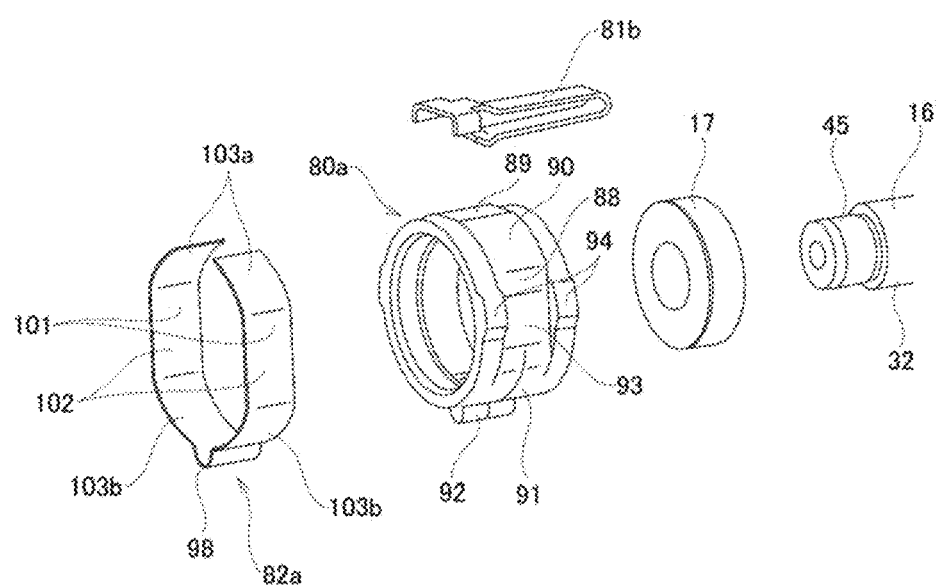
FIG. 22 is an exploded perspective view of the guide assembly and the tip end portion of the worm of the third example.

FIGS. 20 to 22 illustrate a third example of the present invention. This example is a modification of the second example. In this example, the elastic biasing means 81b that elastically biases the holder member (guide member) 80a in a direction approaching the worm wheel 15 is configured by a leaf spring formed by bending a metal plate having elasticity into a substantially U-shape. The holder member 80a has a structure in which the protruding portion 86 of the holder member 80 of the second example is omitted, that is, a structure including only the tubular portion 85. The elastic biasing means 81b is held between the non-contact portion 89 having a flat-surface shape provided at an end portion of the outer circumferential surface of the holder member 80a on the side far from the worm wheel 15 and the holder holding portion 83 of the housing 14a in a state of being elastically compressed. As a result, elasticity in a direction approaching the worm wheel 15 is applied to the holder member 80a. In this example as well, the guide assembly 77b may be formed by arranging the elastic biasing means 81b, the elastic holding means 82a, and the support bearing 17 to the holder member 80a. The configuration and operational effects of the other parts are the same as those of the first example and the second example.

The electric assist device of the present invention may be incorporated not only into a column assist type electric power steering device, but also into an electric power steering device having various structures.

Figure 23:
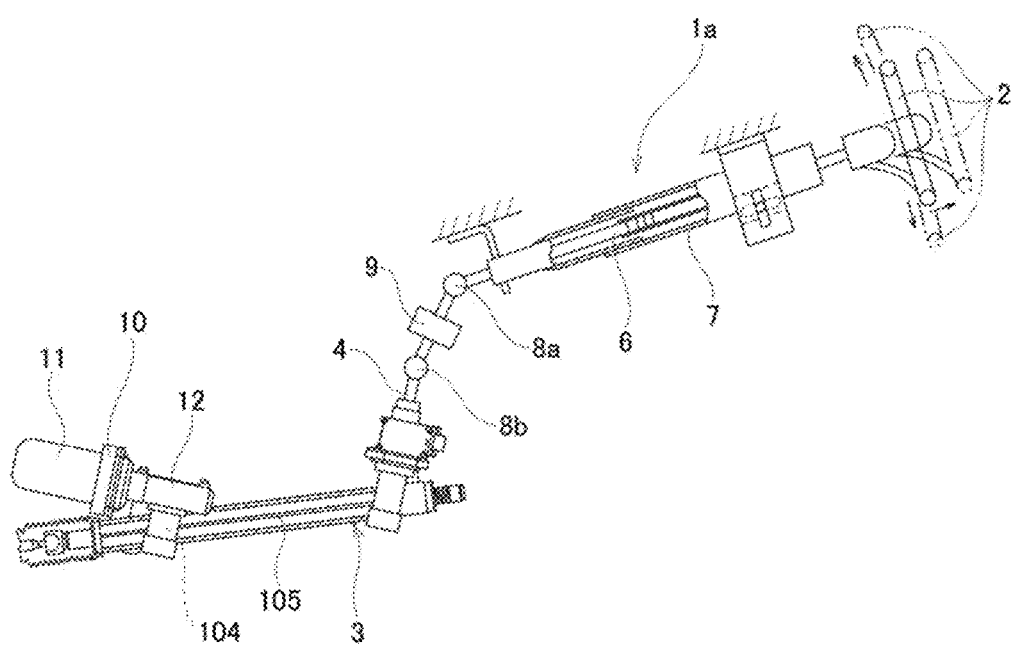
FIG. 23 is a partial cross-sectional view illustrating an example of a rack assist type electric power steering device which may incorporate the electric assist device of the present invention.

More specifically, for example, in a rack assist type electric power steering device 1a as illustrated in FIG. 23, a rotating shaft 104 to which a worm wheel 15 is externally fitted and fixed is arranged in a portion shifted in the width direction of the vehicle from the input shaft 4 of the steering gear unit 3, and the pinion teeth provided at the tip end portion of the rotating shaft 104 are meshed with the teeth portion of the rack 105 of the steering gear unit 3.

Figure 24:
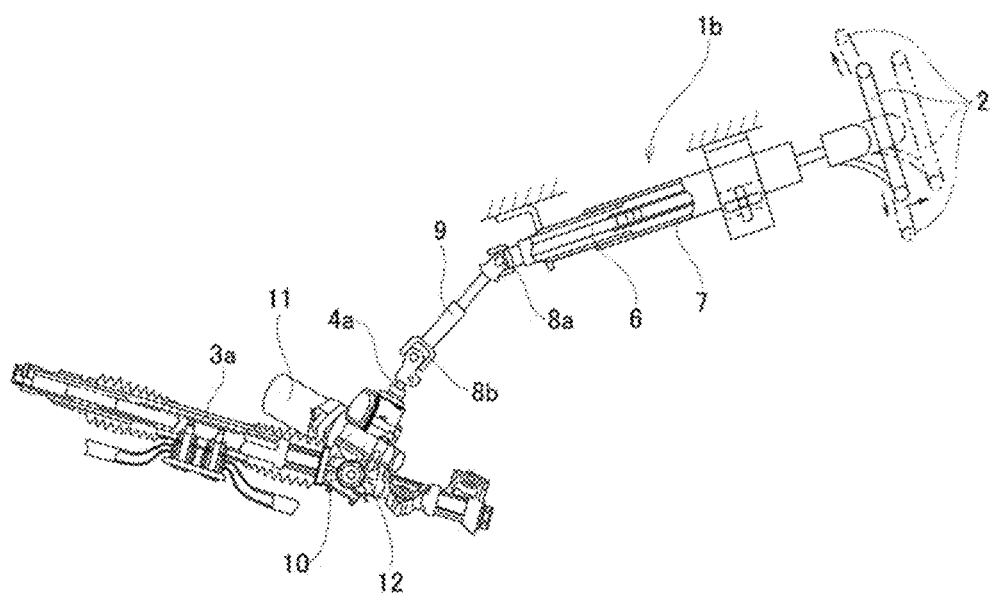
FIG. 24 is a partial cross-sectional view illustrating an example of a pinion assist type electric power steering device which may incorporate the electric assist device of the present invention.
Figure 25:
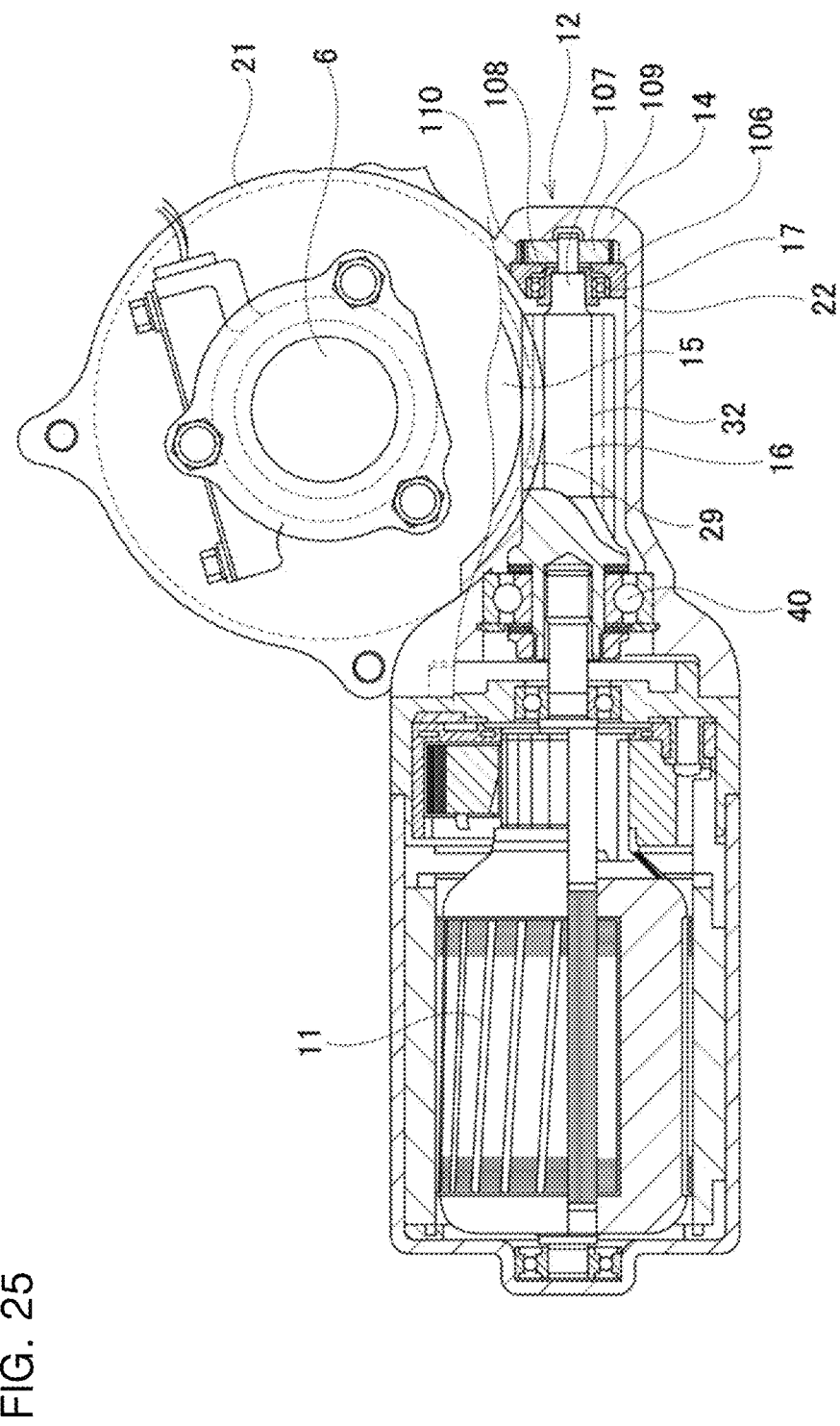
FIG. 25 is a cross-sectional view illustrating an example of a conventional structure of a worm reducer.

In the pinion assist type electric power steering device 1b as illustrated in FIG. 24, the worm wheel 15 of the worm reducer 12 is supported and fixed to the input shaft 4a of the steering gear unit 3a.

The worm reducer of the present invention may be incorporated not only into the electric assist device but also into various mechanical device.

REFERENCE SIGNS LIST 1, 1a, 1b Electric power steering device
2 Steering wheel
3, 3a Steering gear unit
4, 4a Input shaft
5 Tie rods
6 Steering shaft
7 Steering column
8a, 8b Universal joint
9 Intermediate shaft
10 Electric assist device
11 Electric motor
12, 12a, 12b, 12c Worm reducer
13 Output shaft
14, 14a Housing
15 Worm wheel
16 Worm
17 Support bearing
18 Guide member
19 Pressing leaf spring
20 Holding leaf springs
21 Wheel housing portion
22, 22a Worm housing portion
23 Cover
24 Cylindrical surface portion
25 Stepped portion
26 Guide support portion
27 Inward flange portion
28 Engaging concave portion
29 Wheel teeth
30 Inner wheel element
31 Outer wheel element
32 Worm teeth
33 Torque transmission joint
34 Drive-side transmission member
35 Driven-side transmission member
36 Elastic member
37 Coupling
38 Fitting tubular portion
39 Flange portion
40 Ball bearing
41 Outer ring
42 Inner ring
43 Balls
44 Retaining ring
45 Small-diameter tubular portion
46 Inner ring
47 Outer ring
48 Rolling bodies
49 Main body portion
50 Engaging convex portion
51 Locking groove
52 Elastic ring
53 Bearing surface portions
54 Concave curved surface portion
55 Engaging surface portion
56 Base portion
57a, 57b Pedestal surface portion
58 Holding surface portion
59 Locking convex portion
60 Notch portion
61 Side wall portion
62 Concave groove
63a, 63b Locking notch
64 Base portion
65 Folded portion
66 Curved portion
67 Locking hole
68 Base portion
69a, 69b Arm portion
70 Locking piece
71 Cover
72 Circular hole
73 Locking claw
74 Rotating shaft
75 Rack
76 Elastic member
77, 77a, 77b Guide assembly
78 Retaining ring
79 Locking concave portion 80, 80a Holder member (guide member)
81, 81a, 81b Elastic biasing means
82, 82a Elastic holding means
83 Holder holding portion
84 Engaging portion on the housing side
85 Tubular portion
86 Protruding portion
87 Bearing support portion
88 Flat surface portions on the holder side
89 Non-contact portion
90 Partially cylindrical surface portion on the distal side
91 Partially cylindrical surface portion on the proximal side
92 Engaging portion on the holder side
93 First convex portions
94 Second convex portion
95 Partial cylindrical portion
96 Side wall portion
97 Locking concave portion
98 Connecting portion
99 Coil portion
100 Arm portion
101 Elastic piece
102 Flat plate portion
103a, 103b Supported portion
104 Rotating shaft
105 Rack
106 Holder
107 Large diameter portion
108 Bush
109 Pad
110 Helical torsion spring

The invention claimed is:

1. A worm reducer comprising:
a housing having a wheel housing portion, and a worm housing portion arranged in a skew position with respect to the wheel housing portion and having a middle section in an axial direction of the worm housing portion which is open to the wheel housing portion;
a worm wheel having wheel teeth on an outer circumferential surface thereof, and supported inside the wheel housing portion so as to be able to rotate freely;
a worm having worm teeth which engage with the wheel teeth on an outer circumferential surface thereof, and supported inside the worm housing portion so as to be able to rotate freely;
a support bearing having an inner ring which is externally fitted to a tip end portion of the worm and an outer ring which is arranged coaxially with the inner ring around the inner ring;
an elastic biasing means elastically biasing the outer ring toward a side of the worm wheel directly; and
an elastic holding means comprising a leaf spring which includes at least portions having a flat plate shape, the portion disposed on both sides of the outer ring or a member other than the outer ring in a second direction orthogonal to a first direction which is a biasing direction by the elastic biasing means and to a center axis of the worm housing portion, and elastically holding the outer ring from both sides in the second direction either directly or through a member other than the outer ring.

2. The worm reducer according to claim 1, wherein the worm reducer comprises a guide member to which the outer ring is internally fitted so as to be able to displace in the first direction, the guide member internally fitted inside the worm housing portion, and the elastic holding means is arranged at a portion between the outer ring and the guide member.

3. The worm reducer according to claim 2, wherein the elastic holding means comprises a pair of holding leaf springs including the portions having a flat shape, the pair of holding leaf springs arranged in portions on both sides in the second direction of a portion between the outer ring and the guide member.

4. The worm reducer according to claim 3, wherein each of the pair of holding leaf springs is formed in a substantially flat plate shape as a whole.

5. The worm reducer according to claim 4, wherein each of the pair of holding leaf springs has a pair of distal side arm portions arranged so as to be separated from each other in an axial direction of the guide member and a base portion connecting base-end portions of the pair of distal side arm portions to each other and having an inside surface in a radial direction of the guide member, the inside surface elastically brought into contact with an outer circumferential surface of the outer ring.

6. The worm reducer according to claim 5, wherein each of the pair of holding leaf springs comprises a pair of proximal side arm portions extending from end portions on both sides of the base portion in the axial direction of the guide member toward a side close to the worm wheel in the first direction.

7. The worm reducer according to claim 3, wherein each of the pair of holding leaf springs comprises a locking piece for locking each of the pair of holding leaf springs to the guide member.

8. The worm reducer according to claim 1, wherein the elastic biasing means elastically presses a portion of the outer ring on a side far from the worm wheel.

9. The worm reducer according to claim 8, wherein the elastic biasing means comprises a leaf spring.

10. The worm reducer according to claim 9, wherein the leaf spring of the elastic biasing means is formed by bending a metal plate having elasticity into a substantially U-shape.

11. The worm reducer according to claim 1, wherein the worm reducer comprises a guide member to which the outer ring is internally fitted so as to be able to displace in the first direction, the guide member internally fitted inside the worm housing portion, and the elastic biasing means is arranged at a portion between the outer ring and the guide member or between the outer ring and the worm housing portion.

12. The worm reducer according to claim 1, wherein the worm reducer comprises a guide member to which the outer ring is internally fitted so as to be able to displace in the first direction, the guide member internally fitted inside the worm housing portion, and the guide member comprises a bearing surface portion which directly faces the outer ring at least at one location in a circumferential direction of an inner circumferential surface of the guide member on a side far from the worm wheel in the first direction.

13. The worm reducer according to claim 1, wherein the worm reducer comprises:
a guide member to which the outer ring is internally fitted so as to be able to displace in the first direction, the guide member internally fitted inside the worm housing portion; and
an elastic ring elastically held between an inner circumferential surface of the worm housing portion and an outer circumferential surface of the guide member.

14. The worm reducer according to claim 13, wherein an elastic compression amount of the elastic ring in a portion on a side close to the worm wheel is larger than an elastic compression amount of the elastic ring in a portion on a side far from the worm wheel.

15. The worm reducer according to claim 14, wherein the elastic ring is locked to the outer circumferential surface of the guide member in a state where a center axis of the elastic ring is offset with respect to a center axis of the guide member toward the side close to the worm wheel in the first direction.

16. The worm reducer according to claim 1, wherein the worm reducer comprises:
   a guide member to which the outer ring is internally fitted so as to be able to displace in the first direction, the guide member internally fitted inside the worm housing portion; and
   a cover supported by an opening of the guide member located on a tip end side of the worm.

17. A worm reducer comprising:
   a housing having a wheel housing portion, and a worm housing portion arranged in a skew position with respect to the wheel housing portion and having a middle section in an axial direction of the worm housing portion which is open to the wheel housing portion;
   a worm wheel having wheel teeth on an outer circumferential surface thereof, and supported inside the wheel housing portion so as to be able to rotate freely;
   a worm having worm teeth which engage with the wheel teeth on an outer circumferential surface thereof, and supported inside the worm housing portion so as to be able to rotate freely;
   a support bearing having an inner ring which is externally fitted to a tip end portion of the worm and an outer ring which is arranged coaxially with the inner ring around the inner ring;
   a guide member to which the outer ring is internally fitted, the guide member internally fitted inside the worm housing portion;
   an elastic biasing means arranged at a portion between the worm housing portion and the guide member and elastically biasing the outer ring toward a side of the worm wheel through the guide member; and
   an elastic holding means comprising a leaf spring which includes at least portions having a flat plate shape, the portion disposed on both sides of the outer ring or a member other than the outer ring in a second direction orthogonal to a first direction which is a biasing direction by the elastic biasing means and to a center axis of the worm housing portion, and elastically holding the outer ring from both sides in the second direction either directly or through the guide member.

18. An electric assist device, comprising:
an electric motor, and
a worm reducer which increases torque of the electric motor and applies the torque to a rotating shaft which rotates with rotation of a steering wheel or to a linear motion shaft of a steering gear unit, wherein
the worm reducer is composed of the worm reducer according to claim 1.

* * * * *